United States Patent
Mori et al.

[11] Patent Number: 5,982,715
[45] Date of Patent: Nov. 9, 1999

[54] MAGNETO-OPTICAL RECORDING MEDIUM HAVING A SIGNAL REPRODUCING REGION OF THE REPRODUCING LAYER LARGER THAN THE RECORD BIT IN THE RECORDING LAYER

[75] Inventors: Go Mori, Nara; Naoyasu Iketani, Tenri; Michinobu Mieda, Shiki-gun; Ippei Suzuki, Tenri; Junji Hirokane; Akira Takahashi, both of Nara, all of Japan

[73] Assignee: Sharp Kabushiki Kaisha, Osaka, Japan

[21] Appl. No.: 09/116,328

[22] Filed: Jul. 15, 1998

[30] Foreign Application Priority Data

Jul. 15, 1997 [JP] Japan ................................. 9-189487

[51] Int. Cl.$^6$ ........................................ G11B 11/00
[52] U.S. Cl. ........................................ 369/13; 369/275.2
[58] Field of Search ............... 369/275.3, 275.2, 369/275.1, 13, 116, 14, 47, 283, 288; 360/116, 59; 428/694 ML, 694 RE, 694 EC, 694 MM

[56] References Cited

U.S. PATENT DOCUMENTS

| 5,623,458 | 4/1997 | Matsumoto et al. ................ 369/13 |
| 5,629,908 | 5/1997 | Hirokane et al. ................ 369/13 |
| 5,790,513 | 8/1998 | Hiroki et al. ................ 369/275.2 |

FOREIGN PATENT DOCUMENTS

| 0619577 | 10/1994 | European Pat. Off. . |
| 1-143041 | 6/1989 | Japan . |
| 8-007350 | 1/1996 | Japan . |

OTHER PUBLICATIONS

"The High Density Magneto–Optical Disk by Magnetic domain Expansion Readout" H. Awano, et al., Lecture Paper of the 20th Seminar of the Society of Applied Magnetics (1996), 22p.E–4, pp 313.

*Primary Examiner*—Ali Neyzari
*Attorney, Agent, or Firm*—David G. Conlin; George W. Neuner

[57] ABSTRACT

A magneto-optical recording medium with a reproducing layer that exhibits in-plane magnetization at room temperature and that comes to exhibit perpendicular magnetization as temperature rises. The second shielding layer is used to block the magnetization of record bits other than a record bit to be reproduced from being copied on a signal reproducing area in the reproducing layer. Consequently, even in the case of high-density record bits in the recording layer, only the magnetization of the record bit to be reproduced is copied on the reproducing layer. Therefore, the application of the magneto-optical recording medium makes it possible to produce superior reproducing signals even in the case where the records bits with high density are formed on the recording layer.

42 Claims, 7 Drawing Sheets

MAGNETO-OPTICAL RECORDING MEDIUM HAVING A SIGNAL REPRODUCING REGION OF THE REPRODUCING LAYER LARGER THAN THE RECORD BIT IN THE RECORDING LAYER

FIELD OF THE INVENTION

The present invention relates to a magneto-optical recording medium for carrying out information recording and reproduction by using a modulated light beam and/or magnetic field.

BACKGROUND OF THE INVENTION

Conventionally, magneto-optical recording media using the magneto-optical effect have been known as an information recording medium with a large capacity capable of performing repetitive re-writing operations. And various studies and researches have been made in order to achieve high-density recording in the magneto-optical recording medium.

However, one of the disadvantages with this magneto-optical recording medium of this type is that when the diameter of a recording bit that forms a recording domain or when the interval of the recording bits is relatively small with respect to the diameter of a light beam spot focused on the recording medium, the reproducing characteristic deteriorates.

This is caused by the fact that in the case of the small diameter of a record bit or the small interval between record bits, since adjacent record bits are included within the spot of a light beam which has been converged on a target record bit to be reproduced, individual record bits can not be reproduced separately from other record bits.

Magneto-optical recording media, which are devised to overcome the above-mentioned disadvantage, have been proposed by reference (1) Japanese Laid-Open Patent Publication No. 150418/1994 (Tokukaihei 6-150418) and reference (2) "Ultra-high density magneto-optical disk using a magnetic-domain enlarging reproduction", 22pE-4 in papers of the 20th Symposium of Japan Applied Magnetics Society (1996).

In a construction described in reference (1) (hereinafter, referred to as the first prior art medium), a reproducing layer, which exhibits in-plane magnetization at room temperature and comes to exhibit perpendicular magnetization with temperature rises, is provided. Further, a non-magnetic intermediate layer is placed between the reproducing layer and the recording layer so that a magnetostatical coupling is realized between the reproducing layer and the recording layer.

Thus, the first prior art medium is designed so that the portion of the reproducing layer that is in the in-plane magnetization state is allowed to mask record bits (recording magnetic-domain information) of the recording layer corresponding to the above-mentioned portion. In other words, in the first prior art medium, this mask prevents record bits adjacent to the record bit to be reproduced from being included within the light beam spot, thereby making it possible to reproduce individual record bits separately.

In a construction as described in reference (2) (hereinafter, referred to the second prior art medium), a non-magnetic intermediate layer is interpolated between the recording layer and the reproducing layer in the same manner as the construction described in reference (1). Here, in this construction, a magnetic domain which is larger than the record bit on the recording layer is formed on the reproducing layer by a magnetic field generated from the recording layer. The reproducing system of this type, which carries out a reproducing operation by forming a magnetic domain larger than the record bit on the reproducing layer, is referred to as the magnetic-domain enlarging reproduction system.

However, it has been found that in the first prior art medium, when the diameter of a record bit is made extremely small, or when the interval between record bits is made extremely small, the intensity of the reproduced signal decreases, failing to provide sufficient reproduced signals.

Moreover, in the second prior art medium, a reproducing operation is not available unless the respective record bits are maintained in an isolated state. In other words, when the interval between the record bits in the recording layer is small (in the case of a high recording density), a plurality of record bits are located under the domain of the reproducing layer. In this case, the magnetic domain of the reproducing layer is subjected to magnetic fluxes (magnetic fields) from the plural record bits. That is, the problem with this construction is that it is not possible to apply only the magnetic flux from the record bit to be reproduced to the magnetic domain of the reproducing layer.

SUMMARY OF THE INVENTION

The objective of the present invention is to provide a magneto-optical recording medium which can generate a preferable reproduced signal by copying only the magnetization of a record bit to be reproduced onto a reproducing layer, even in the case when the diameter of record bits in the recording layer is made extremely small or when the interval of the records bits is made extremely small.

In order to achieve the above-mentioned objective, the magneto-optical recording medium of the present invention is provided with: a recording layer that is made of a perpendicular magnetization film and that has record bits for recording information; a reproducing layer that is maintained in a perpendicular magnetization state in a signal-reproducing region in which the magnetization of each record bit on the recording layer is copied onto said region; and a first shielding layer that is formed between the recording layer and the reproducing layer and that prevents magnetizations of recorded bits other than the record bit to be reproduced in the recording layer from being copied on the reproducing layer.

In the above-mentioned construction, the recording layer is a magnetic film on which record bits for recording information are formed. Further, the reproducing layer is a magnetic film which is maintained in the perpendicular magnetization state at least in the signal reproducing region.

The signal reproducing region serves as a region on the reproducing layer which copies the magnetization of a record bit to be reproduced. In the above-mentioned construction, information, recorded in the record bit to be reproduced, is reproduced by receiving a reflected light beam from the region.

Here, the signal reproducing region is a high-temperature portion that is formed, for example, by applying a light beam thereto. Further, with respect to the magnetized state of regions other than the signal reproducing region in the reproducing layer, any state may be used; however, it is preferable to maintain them in the in-plane magnetization state.

In the above-mentioned construction, the first shielding layer is formed between the recording layer and the reproducing layer. The first shielding layer is used for preventing the magnetization of record bits other than the record bit to be reproduced from being copied onto the signal reproducing region of the reproducing layer.

In other words, the first shielding layer is, for example, exchange coupled or electrostatically coupled with the magnetization of the record bits other than the record bit to be reproduced so that the leakage magnetic field from the magnetization does not affect the reproducing layer. Then, the leakage magnetic field of the record bit to be reproduced is transmitted through the first shielding layer or the magnetization of the record bit is copied thereon, with the result that the magnetization of the record bit is copied onto the signal reproducing region of the reproducing layer.

With this construction, in the above-mentioned magneto-optical recording medium, even when record bits in the recording layer are designed to have a high density, the magnetization of record bits other than the record bit to be reproduced gives no adverse effects on the reproducing layer. For this reason, only the magnetization of the record bit to be reproduced is copied onto the signal reproducing region of the reproducing layer. Therefore, by using the magneto-optical recording medium of this type, it becomes possible to obtain a desired reproduced signal even when information recorded with high density is reproduced.

For a fuller understanding of the nature and advantages of the invention, reference should be made to the ensuing detailed description taken in conjunction with the accompanying drawings.

DESCRIPTION OF THE EMBODIMENTS

The following description will discuss the magneto-optical recording medium of the present invention.

First, prior to explaining the construction and function of the magneto-optical recording medium of the present invention, an explanation will be given of the construction and function of a conventional magneto-optical recording medium.

Figure 2:
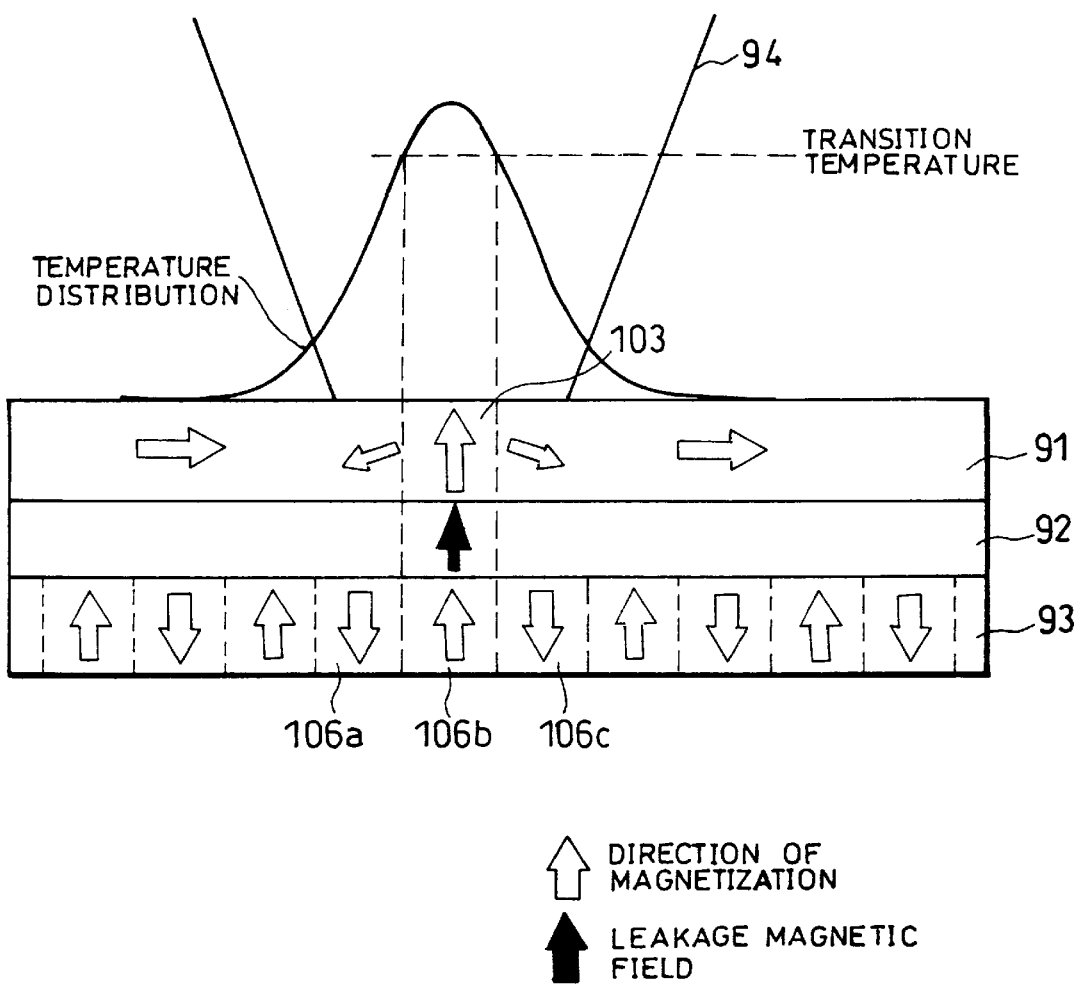
FIG. 2 is an explanatory drawing which shows the construction and the reproducing principle of a conventional magneto-optical recording medium.
Figure 3:
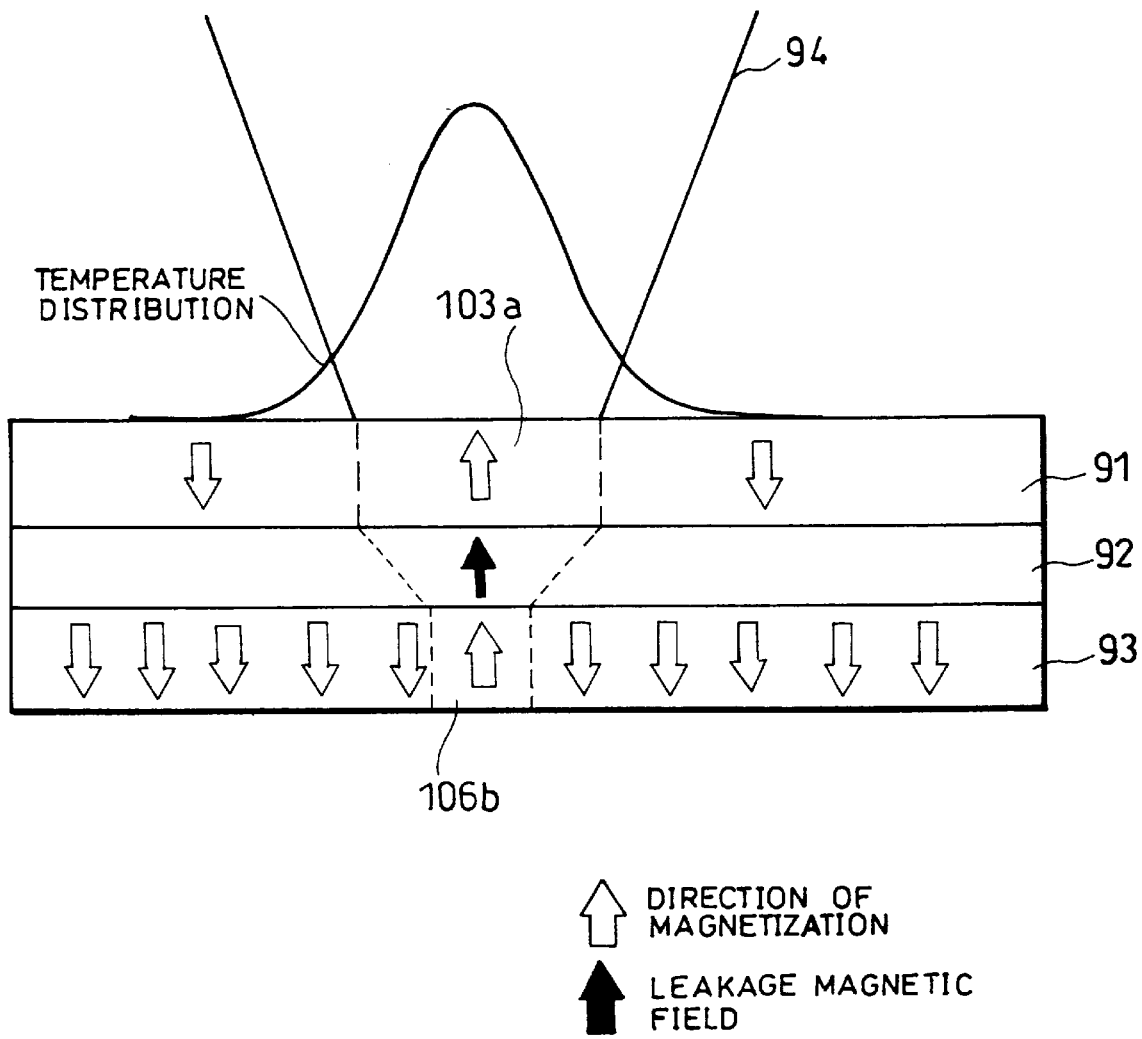
FIG. 3 is an explanatory drawing which shows a reproducing operation of the conventional magneto-optical recording medium, wherein record bits in a recording layer are enlarged and copied onto a reproducing layer.
Figure 4:
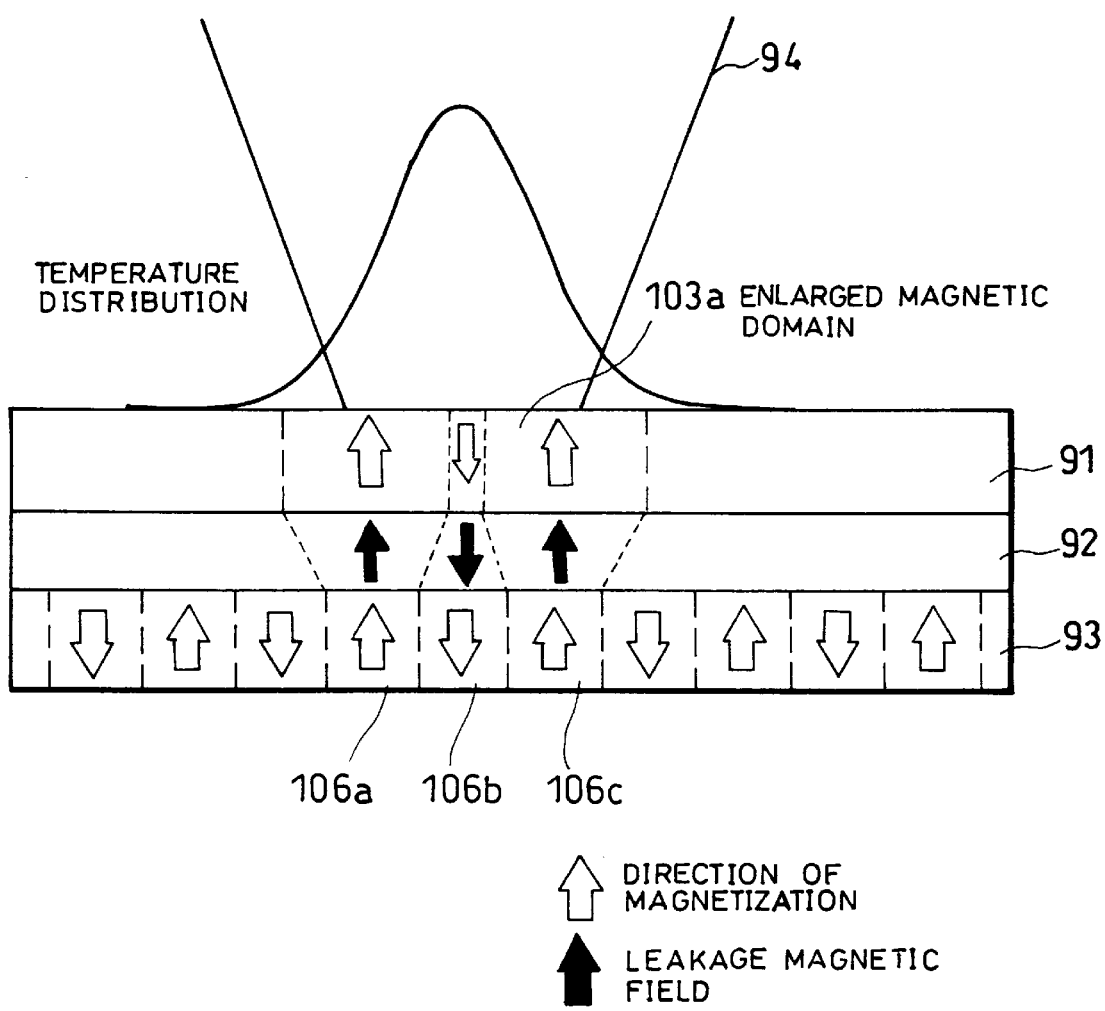
FIG. 4 is an explanatory drawing which shows a reproducing operation of the conventional magneto-optical recording medium, wherein record bits, which are formed with high density in the recording layer, are enlarged and copied onto the reproducing layer.

FIGS. 2 through 4 are explanatory drawings that show the construction and function of the conventional magneto-optical recording medium (hereinafter, referred to as the prior art medium). As illustrated in FIG. 2, the prior art medium has a reproducing layer 91, a non-magnetic intermediate layer 92 and a recording layer 93.

The reproducing layer 91 is made of an alloy of a rare-earth metal and a transition metal, and upon irradiation with a light beam 94, the portion having a temperature rise to not less than a predetermined transition temperature comes to exhibit perpendicular magnetization.

The recording layer 93 is made of an alloy of a rare-earth metal and a transition metal, and has its compensation temperature at room temperature. Moreover, record bits for recording information are formed on the recording layer 93. In FIG. 2, the record bits are represented by portions on the recording layer 93 that are divided by broken lines. Further, in this Figure, the record bit that is to be reproduced is referred to as record bit 106b, and records bits adjacent to record bit 106b are referred to as record bits 106a and 106c. Here, the compensation temperature refers to a temperature at which the magnitude of the magnetic moment of the rare-earth metal balances the magnitude of the magnetic moment of the transition metal.

The non-magnetic intermediate layer 92 is formed between the reproducing layer 91 and the recording layer 93, and makes it possible to achieve magnetostatical coupling by cutting off the exchange coupling between the reproducing layer 91 and the recording layer 93.

When the prior art medium is subjected to a reproducing operation, a light beam 94 is converged and directed from the reproducing layer 91 side. Upon irradiation with the light beam 94, a temperature distribution, which shows a Gaussian distribution corresponding to the intensity distribution of the light beam 94 as shown in FIG. 2, is formed on the prior art medium.

Following the formation of this temperature distribution, only the magnetization of the record bit 106 in the center of the spot of the light beam 4 that has a temperature rise exceeding a predetermined temperature is allowed to increase. Further, due to a leakage magnetic field caused by the increased magnetization, the magnetization direction of the recording layer 91 is made coincident with that of the record bit 106b, with the result that a magnetic domain 103, which is a copy of the magnetization direction of the record bit 106b, is formed on the recording layer 91.

Then, information is reproduced by detecting as a change in the Kerr rotation angle the magnetization direction of the magnetic domain 103 to which the magnetization direction of the record bit 106b has been copied, thereby achieving a super-resolution reproducing operation.

Here, in the prior art medium, the greater the magnetic domain 103 formed on the reproducing layer 91, the greater the reproduced signal. FIG. 3 is an explanatory drawing that shows a state in which the enlarged magnetic domain 103a is formed in the reproducing layer 91 of the prior art medium. As shown in this Figure, in this state the enlarged magnetic domain 103a is formed in the reproducing layer 91. The enlarged magnetic domain 103a is larger than the record bit 106b of the recording layer 93, and has a size as large as 1 μm that is the spot diameter of the light beam 94.

The CNR (carrier to noise ratio) of the reproducing signal is increased by forming such an enlarged magnetic domain 103a in the reproducing layer 91; therefore, it is possible to obtain a high-quality reproduced signal.

However, the direction of magnetization in the reproducing layer 91 is determined by a leakage magnetic field from the recording layer 93. Therefore, in the case of information recorded on the recording layer 93 with high density, it is not possible to desirably copy the magnetization from the recording layer 93 to the reproducing layer 91.

In other words, in a state as shown in FIG. 3, record bit 106b having the upward magnetization direction exists in an isolated manner among those record bits having the downward magnetization direction. In this state, the portion irradiated with the light beam 94 in the reproducing layer 91 is influenced by a leakage magnetic field exerted by only one record bit 106b. Consequently, an enlarged magnetic domain 103a corresponding to this record bit 106b is formed on the reproducing layer 91.

However, when random high-density recording is attempted by narrowing the intervals of the record bits in the recording layer 93, the portion irradiated with the light beam 94 in the reproducing layer 91 tends to be influenced by leakage magnetic fields exerted by a plurality of record bits.

FIG. 4 is an explanatory drawing that shows a state in which leakage magnetic fields from record bit 106b and record bits 106a and 106c adjacent thereto are exerted on the reproducing layer 91. As illustrated in this Figure, in the case when the magnetization direction of record bit 106b is opposite to the magnetization direction of record bits 106a and 106c, the influence of the leakage magnetic field, exerted on the enlarged magnetic domain 103a from record bit 106b, is weakened, thereby making it difficult to copy the magnetization direction of record bit 106b. Moreover, in the case when a plurality of record bits 106a and 106c having the upward magnetization are located close to each other to a certain degree, the magnetization direction of these record bits 106a and 106c tends to be copied onto the enlarged reproducing magnetic domain 103, thereby making it difficult to carry out a desired reproducing operation.

Consequently, in this state, it becomes impossible to accurately reproduce information corresponding to the record bit 106b. Further, this state raises another problem in which the magnetization of the reproducing layer 91 becomes susceptible to influences of external floating magnetic fields, etc.

Next, the following description will discuss the magneto-optical recording medium (hereinafter, referred to as the present recording medium) of the present invention. The present recording medium is a magneto-optical recording medium for carrying out a super-resolution reproducing operation.

Figure 1:
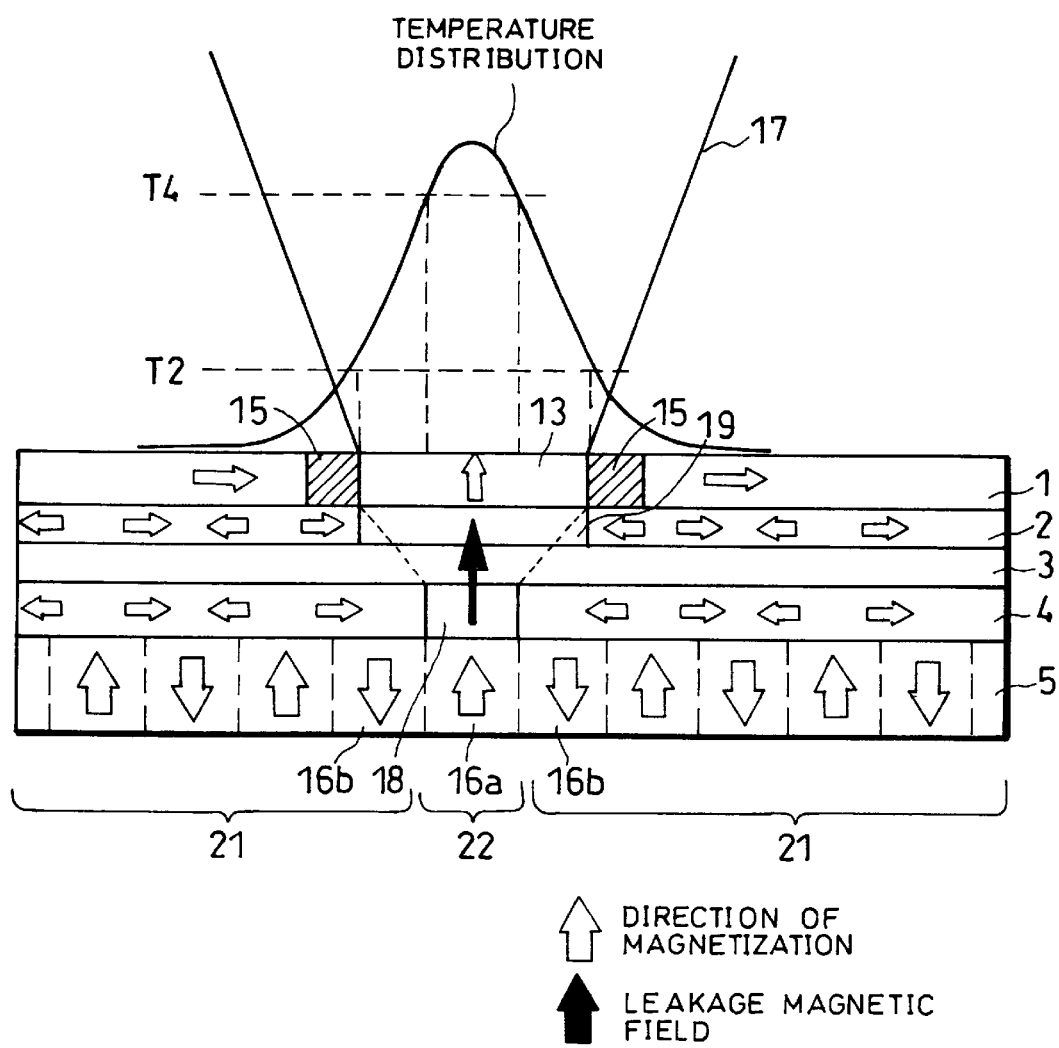
FIG. 1 is an explanatory drawing which shows the construction and the reproducing principle of the magneto-optical recording medium of the present invention.

FIG. 1 is an explanatory drawing that shows the construction and the reproducing principle of the present recording medium. As illustrated in this Figure, the present recording medium is constituted by a reproducing layer 1, a second shielding layer 2, a non-magnetic intermediate layer 3, a first shielding layer 4 and a recording layer 5 that are stacked in this order. Here, arrows in FIG. 1 indicate the magnetization directions of the respective layers.

The reproducing layer 1 is a magnetic film made of an alloy of a rare-earth metal and a transition-metal, and upon irradiation with a light beam, the irradiated portion comes to exhibit perpendicular magnetization.

The second shielding layer 2, which has a predetermined critical temperature T2, is formed so as to be adjacent to the reproducing layer 1. The second shielding layer 2 will be discussed later.

The non-magnetic intermediate layer 3, which is constituted by, for example, a film made of a non-magnetic metal, a film made of a non-magnetic dielectric, or a layer made of a stacked films of these, is provided so as to achieve magnetostatical coupling between the reproducing layer 1 and the recording layer 5.

The recording layer 5, which is a perpendicular magnetization film made of a rare-earth metal and a transition metal, is provided with record bits for recording information. In FIG. 1, the record bits are indicated by portions divided by broken lines in the recording layer 5. Moreover, in this Figure, a record bit which is to be reproduced is indicated as record bit 16a, and these record bits located adjacent to record bit 16a are indicated as record bits 16b. Here, in the same manner as the magnetization of those record bits in the recording layer 93 shown in FIG. 2, the magnetization of the record bits of the recording layer 5 is allowed to increase as the temperature rises.

The first shielding layer 4, which has a predetermined critical temperature T4, is formed so as to be adjacent to the recording layer 5. Critical temperature T4 is a temperature that can be attained by application of a light beam.

Here, the first shielding layer 4 is allowed to magnetically mask the magnetization of the recording layer 5 by those portions having temperatures less than critical temperature T4. In other words, the first shielding layer 4 magnetically masks the magnetization from portions having temperatures less than critical temperature T4 in the recording layer 5. In contrast, in a high temperature portion not less than critical temperature T4, the first shielding layer 4 does not mask the magnetization of the recording layer 5 so as to allow the leakage magnetic field to pass from the recording layer 5 to the reproducing layer 1. That is, magnetic aperture 18 is formed at the high temperature portion in the first shielding layer 4.

Accordingly, as illustrated in FIG. 1, when upon reproduction, a light beam 17 is directed, a high-temperature portion 22, which includes record bit 16a and has a temperature not less than critical temperature T4, and low-temperature portions 21, which include record bits 16b and has temperatures less than critical temperature T4, are formed in the present recording medium. Then, in the low-temperature portions 21, the first shielding layer 4 serve as a mask for record bits 16b, while in the high-temperature portion 22, aperture 18 is formed in the first shielding layer 4. With this arrangement, only the magnetization of record bit 16a within the high-temperature portion 22 is copied on the reproducing layer 1 so that an enlarged magnetic domain 13 corresponding to the magnetization of record bit 16a is formed in the reproducing layer 1.

As described above, in the present recording medium, since the first shielding layer 4 is provided, no leakage magnetic field from record bits 16b adjacent to record bit 16a gives adverse effects on the reproducing layer 1, even in the case when the reproducing operation is carried out by enlarging and reproducing the magnetization of record bit 16a in the recording layer 5. Therefore, the present recording medium serves as a magneto-optical recording medium capable of a desired magnetic-domain enlarging reproduction.

Any layer may be used as the first shielding layer 4 as long as it magnetically masks the magnetization of the low-temperature portion 21 in the recording layer 5 that have temperatures less than critical temperature T4, while it does not mask the magnetization of the high-temperature portion 22 in the recording layer 5 that has a temperature not less than critical temperature T4. For example, magnetic films, which have magnetic properties as shown in the following items (1) through (3), may be adopted:

(1) any magnetic layer that exhibits in-plane magnetization at temperatures less than critical temperature T4 and that has its magnetization disappeared or extremely minimized at temperatures not less than T4, (2) any magnetic layer that exhibits a magnetization state that is opposite to the magnetization state of the recording layer 5 at temperatures less than critical temperature T4 and that has its magnetization disappeared or extremely minimized at temperatures not less than T4, and (3) any magnetic layer that exhibits in-plane magnetization at temperatures less than critical temperature T4 and that exhibits perpendicular magnetization at temperatures not less than critical temperature T4.

Additionally, when a magnetic film having the magnetic properties of the above-mentioned (1) and (2) is used as the first shielding layer 4, it is preferable that the magnetization disappears in the high-temperature portion 22. For this reason, the Curie temperature of the first shielding layer 4 is preferably set lower than the Curie temperature of the recording layer 5.

Moreover, in order to prevent the leakage magnetic field from the recording layer 5 from giving adverse effects on the reproducing layer 1 at the low-temperature portions 21, the magnetization of the first shielding layer 4 is preferably set greater than the magnetization of the recording layer 5 at the low-temperature portions 21 (including portions having room temperature).

Here, it is preferable that the enlarged magnetic domain 13, formed in the reproducing layer 1 during reproduction, is given as a large domain. This is because the greater the enlarged magnetic domain 13, the more the amount of the reproduced signal becomes and the less the noise becomes. Moreover, domain walls formed in the reproducing layer 1 need to be moved in accordance with the leakage magnetic field from the recording layer 5. Consequently, it is preferable to set the coercive force of the reproducing layer 1 as small as possible.

However, it makes no sense to set the enlarged magnetic domain 13 larger than the spot diameter of the light beam from the point of view of signal reproduction. Moreover, it is preferable to erase the enlarged magnetic domain 13 formed in the reproducing layer 13 after reproduction in order to achieve a smooth reproducing operation; however, if the enlarged magnetic domain is too large, it becomes difficult to carry out the erasing operation desirably.

Even in the case when an enlarged magnetic domain 13 having a desired size is formed within the spot diameter of the light beam, the magnetization of the border area 15 (see FIG. 1) adjacent to the enlarged magnetic domain 13 of the reproducing layer 1 becomes instable due to causes as shown in the following items (1) through (3), resulting in noise in the reproducing signal.

(1) The border area 15 is subjected to influences of the leakage magnetic field from record bits 16b adjacent to record bit 16a to be reproduced.

(2) The border area 15 is not located right above record bit 16a. Therefore, in the border area 15, the direction of the leakage magnetic field from record bit 16a is not perpendicular to the film surface.

(3) The temperature distribution of the reproducing layer 1 shows a distribution continuously decreasing from the center area of the light beam spot toward the peripheral area having room temperature. Therefore, in the case when the reproducing layer 1 is a magnetic film that exhibits in-plane magnetization at room temperature and comes to exhibit perpendicular magnetization as the temperature rises, the temperature of the border area 15 coincides with a transition temperature from the perpendicular magnetization state to the in-plane magnetization state.

For this reason, in the present recording medium, the second shielding layer 2 is placed adjacent to the reproducing layer 1 in order to prevent the magnetization of the border area 15 from becoming instable.

The second shielding layer 2 has a predetermined critical temperature T2, and is formed so as to be adjacent to the reproducing layer 1. Here, the second shielding layer 2 exhibits in-plane magnetization from room temperature to critical temperature T2, and has its magnetization disappeared or has its magnetization extremely minimized at temperatures not less than critical temperature T2. In other words, critical temperature T2 is the Curie temperature of the second shielding layer 2, which is attained by the irradiation with a light beam.

The second shielding layer 2 is designed to magnetically mask one portion of the reproducing layer 1 by the portion having temperatures less than critical temperature T2 so that the leakage magnetic field from the recording layer 5 does not give adverse affects on portions other than the enlarged magnetic domain 13 in the reproducing layer 1 (including the border area 15, hereinafter, referred to as unnecessary portions), that is, the potions that are not irradiated with the light beam. In other words, the portions having temperatures less than critical temperature T2 in the second shielding layer 2 are exchange-coupled with the unnecessary portions in the reproducing layer 1 so as to allow the unnecessary portions to exhibit in-plane magnetization.

In contrast, the portion of the second shielding layer 2 having temperatures not less than critical temperature T2 has its magnetization disappeared or has its magnetization extremely minimized; therefore, it does not prevent the leakage magnetic field from reaching from the recording layer 5 to the reproducing layer 1. In other words, magnetic aperture 19 (see FIG. 1) is formed at the portion of the second shielding layer 2 having temperatures not less than critical temperature T2.

Accordingly, in the reproducing layer, the magnetization direction of the enlarged magnetic domain 13 and the magnetization direction of the unnecessary portions that are portions other than this magnetic domain show a drastic change from each other at the border area 15 because of the mask and aperture 19 of the second shielding layer 2. Thus, it becomes possible to positively enlarge and copy the magnetization of record bit 16a of the recording layer 5 to the reproducing layer 1, and also form the enlarged magnetic domain 13 with desired conditions.

Here, the portions masked by the first shielding layer 4 are portions other than record bit 16a in the recording layer 5, and preferably designed to positively shield the leakage magnetic field from this portion. Therefore, aperture 18, formed on the first shielding layer 4, is preferably set to a size not more than record bit 16a.

In contrast, the portions masked by the second shielding layer 2 are portions other than the enlarged magnetic domain 13 in the reproducing layer 1, and preferably designed so as not to prevent the formation of the enlarged magnetic domain 13. Therefore, aperture 19, which is formed at portions having temperatures not less than critical temperature T2 of the second shielding layer 2, is preferably set to a size as large as the enlarged magnetic domain 13.

Therefore, aperture 19 in the second shielding layer 2 is preferably set larger than aperture 18 in the second shielding layer 4.

In this case, upon irradiation with a light beam during a reproducing operation, temperature distributions are formed on the second shielding layer 2 and the first shielding layer 4 almost in the same manner. Therefore, in order to differentiate the sizes of aperture 19 and aperture 18 from each other, critical temperature T4 is set higher than critical temperature T2, as shown in FIG. 1.

Accordingly, for example, in the case of the use of a magnetic film shown in the above-mentioned item (1) or (2) as the first shielding layer 4, the Curie temperature of the first shielding layer 4 is set higher than the Curie temperature of the second shielding layer 2.

Additionally, as described earlier, it is preferable to erase the enlarged magnetic domain 13 formed on the reproducing layer 1 after reproduction, in order to smoothly carry out the reproducing operation on the present recording medium. Therefore, it is preferable to provide the reproducing light beam as pulse light emission so that the magnetic domain is erased with the light beam being not emitted, while the temperature of the medium is raised with the light beam being emitted. With this arrangement, the signal reproduction is desirably carried out by copying record bit 16a of the recording layer 5 on the reproducing layer 1, thereby making it possible to provide higher-quality reproduced signals.

Next, embodiments 1 through 3 of the present invention are discussed as follows:

EMBODIMENT 1

Figure 5:
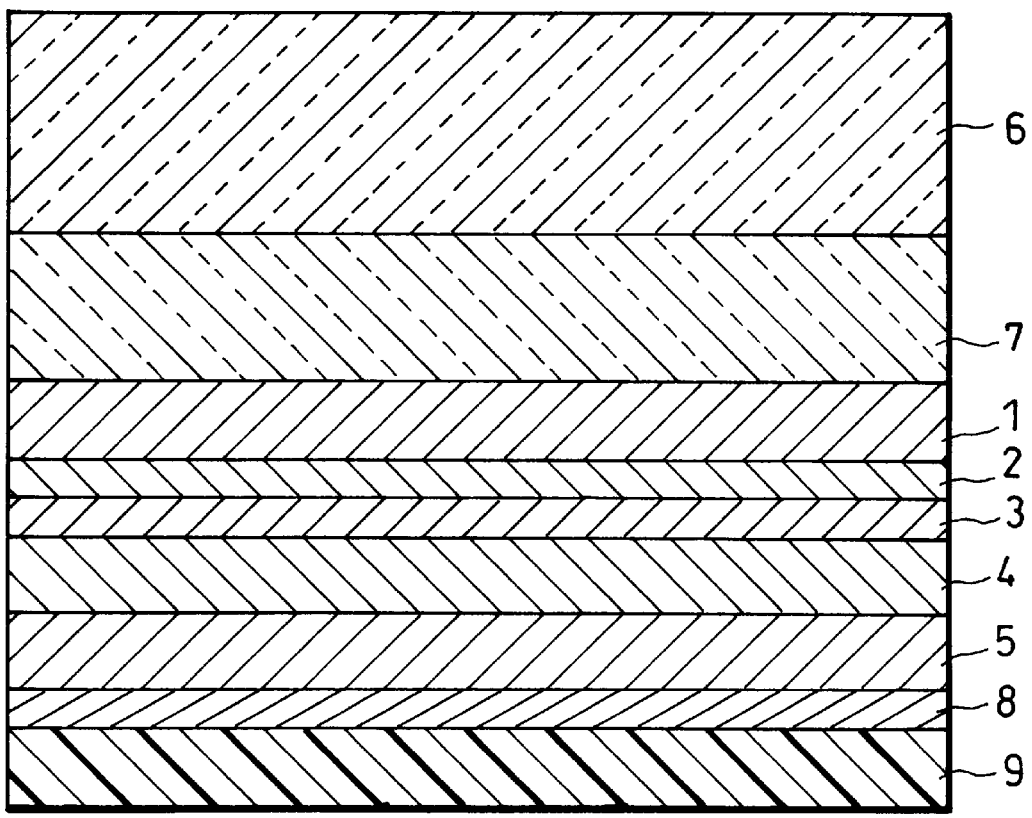
FIG. 5 is an explanatory drawing which shows a construction of the magneto-optical disk in accordance with the first embodiment of the present invention.

The following description will discuss the first embodiment of the present recording medium. FIG. 5 is an explanatory view that shows the construction of a magneto-optical disk (hereinafter, referred to as the present magneto-optical disk) that is the first embodiment of the present recording medium. As illustrated in this Figure, the present magneto-optical disk is constituted by a transparent dielectric layer 7, a reproducing layer 1, a second shielding layer 2, a non-magnetic intermediate layer 3, a first shielding layer 4, a recording layer 5, a protective layer 8 and an overcoat layer 9 that are stacked on a substrate 6 in this order.

In the present magneto-optical disk, the Curie temperature recording method is adopted as its recording method. In this method, a light beam, released from a semiconductor laser, is converged onto the reproducing layer 1 by an objective lens. Then, information is recorded and reproduced by a magneto-optical effect that is known as the polar Kerr effect. The polar Kerr effect refers to a phenomenon in which the direction of rotatory polarization in reflected light is reversed by magnetization that is perpendicular to the incident surface of a light beam. In other words, the direction of rotatory polarization in the light beam is changed by the direction of the magnetization.

The substrate 6, which is made of a transparent base material such as polycarbonate, is formed into a disk shape.

The transparent dielectric layer 7 is preferably made from a material with a substantial refractive index, such as AlN, SiN, AlSiN and $TiO_2$. Further, the film thickness of the transparent dielectric layer 7 needs to be set so as to achieve a good interference effect with respect to an incident laser light beam and to increase the Kerr rotation angle on the medium. For this reason, supposing that the wavelength of reproducing light is $\lambda$ and that the refractive index of the transparent dielectric layer 7 is n, the film thickness of the transparent dielectric layer 7 needs to be set to approximately $\lambda/(4n)$. For example, in the case when the wavelength of laser beam is 680 nm, the film thickness of the transparent dielectric layer 7 is preferably set in the range of 40 nm to 100 nm.

The reproducing layer 1 is a magnetic layer made of a rare-earth transition-metal alloy. The composition of the reproducing layer 1 is designed so that it exhibits in-plane magnetization at room temperature and comes to exhibit perpendicular magnetization as the temperature rises. Since the reproducing layer 1 needs to have an effective reproducing property, it is preferably set so as to have a Curie temperature higher than that of the recording layer 5 which will be described later.

The non-magnetic intermediate layer 3 is made of a layer of a dielectric material such as AlN, SiN and AlSiN, or a layer of a non-magnetic metal alloy made of elements such as Al, Ti and Ta, or a stacked layer of the above-mentioned dielectric material and metal. The film thickness of the non-magnetic intermediate layer 3 is set from not less than 1 nm to not more than 40 nm so that the reproducing layer 1 and the recording layer 5 are magnetostatically coupled in a preferable manner.

Each of the second shielding layer 2 and the first shielding layer 4 is a magnetic film which has a rare-earth transition-metal alloy, a rare-earth or a transition metal as its main ingredient and which exhibits in-plane magnetization at temperatures higher than room temperature.

As described earlier, the first shielding layer 4 is constituted by a magnetic film whose composition is designed so that it exhibits in-plane magnetization at low-temperature portions below critical temperature T4, while it has its magnetization disappeared or extremely minimized at high-temperature portions having temperatures not less than critical temperature T4.

Thus, the low-temperature portions mask the leakage magnetic field generated from record bits of the recording layer 5, prevent the unnecessary magnetic field from leaking to the reproducing layer 1, and also prevent the magnetization of the reproducing layer 1 from becoming instable. Moreover, the high-temperature portions allow the leakage magnetic field generated from the recording layer 5 to pass toward the reproducing layer 1.

The second shielding layer 2 is constituted by a magnetic film whose composition is designed so that it exhibits in-plane magnetization at low-temperature portions below critical temperature T2, while it has its magnetization disappeared or extremely minimized at high-temperature portions having temperatures not less than critical temperature T2.

Thus, the low-temperature portions prevent the unnecessary magnetic field of the recording layer 5 from adversely affecting the reproducing layer 1 by masking the leakage magnetic field generated from record bits of the recording layer 5. Further, the high-temperature portions allow the leakage magnetic field generated from the record bits of the recording layer 5 to pass toward the reproducing layer 1. By using these low-temperature portions and high-temperature portions, the second shielding layer 2 allows the magnetization of the reproducing layer 1 to be abruptly inverted at the border area between the enlarged magnetic domain and the portions other than the magnetic domain formed in the reproducing layer 1. Here, the Curie temperature of the second shielding layer 2 is set lower than the Curie temperature of the first shielding layer 4.

The recording layer 5 is made of a perpendicular magnetization film of a rare-earth transition-metal alloy. The film thickness of the recording layer 4 is set in the range of 20 nm to 80 nm.

The protective layer 8 is made of a dielectric material such as AlN, SiN, AlSiN and SiC, or a non-magnetic metal alloy made of elements such as Al, Ti and Ta. The protective layer 8 is formed so as to protect the rare-earth transition-metal alloys used in the reproducing layer 1 and the recording layer 4 from oxidation. The film thickness of the protective layer 8 is set in the range of 5 nm to 60 nm.

The overcoat layer 9 is formed by applying ultraviolet-ray-setting resin or thermosetting resin through a spinner coating method and irradiating it with ultraviolet rays or applying heat to it.

With respect to specific examples of the magneto-optical disk having the above-mentioned construction, its formation method (1) and recording and reproducing characteristics (2) are described separately as follows:

(1) Formation Method

The following description will discuss a formation method of the present magneto-optical disk with the above-mentioned arrangement. The following formation method is one example of formation methods of the present magneto-optical disk. The present magneto-optical disk formed in this example is referred to as sample #1.

In a sputtering device having an Al target, a GdFeCo alloy target, two kinds of GdFeAl alloy targets corresponding to the second shielding layer 2 and the first shielding layer 4, and a GdDyFeCo alloy target, a polycarbonate substrate 6, which has pregrooves and/or prepits and which is formed into a disk shape, was placed on a substrate holder.

After the sputtering device had been evacuated to $1\times10^{-6}$ Torr, a mixed gas of argon and nitrogen was introduced thereto, and electric power was supplied to the Al target so that a transparent dielectric layer 7, made of AlN, was formed on the substrate 6 with a film thickness of 80 nm under a gas-pressure condition of $4\times10^{-3}$ Torr.

Next, after the sputtering device had been again evacuated to $1\times10^{-6}$ Torr, argon gas was introduced thereto, and electric power was supplied to the GdFeCo alloy target under a gas pressure of $4\times10^{-3}$ Torr so that a reproducing layer 1, made of $Gd_{0.30}(Fe_{0.80}Co_{0.20})_{0.70}$, was formed on the transparent dielectric layer 7 with a film thickness of 20 nm. The reproducing layer 1 had such a property that it exhibited in-plane magnetization at room temperature, and came to exhibit perpendicular magnetization at 120° C. Further, the compensation temperature of the reproducing layer 1 was 300° C, and the Curie temperature thereof was 320° C.

Next, electric power was supplied to the first GdFeAl alloy target under a gas pressure of $4\times10^{-3}$ Torr so that a second shielding layer 2, made of $(Gd_{0.11}Fe_{0.89})_{0.5}Al_{0.5}$ was formed on the reproducing layer 1 with a film thickness of 10 nm. The second shielding layer 2 had a Curie temperature of 95° C., and exhibited magnetization in a direction parallel to the film surface from room temperature to the Curie temperature.

Successively, a mixed gas of argon and nitrogen was introduced thereto, and electric power was supplied to the Al target so that a non-magnetic intermediate layer 3, made of AlN, was formed on the second shielding layer 2 with a film thickness of 20 nm under a gas-pressure condition of $4\times10^{-3}$ Torr.

Next, electric power was supplied to the second GdFeAl alloy target under a gas pressure of $4\times10^{-3}$ Torr so that a first shielding layer 4, made of $(Gd_{0.11}Fe_{0.89})_{0.75}Al_{0.25}$ was formed on the non-magnetic intermediate layer 3 with a film thickness of 20 nm. The first shielding layer 4 had a Curie temperature of 120° C. which is higher than that of the second shielding layer 2, and exhibited magnetization in a direction parallel to the film surface from room temperature to the Curie temperature.

Next, after the sputtering device had been again evacuated to $1\times10^{-6}$ Torr, argon gas was introduced thereto, and electric power was supplied to the GdDyFeCo alloy target under a gas pressure of $4\times10^{-3}$ Torr so that a recording layer 5, made of $(Gd_{0.05}Dy_{0.50})_{0.23}(Fe_{0.80}Co_{0.20})_{0.77}$, was formed on the first shielding layer 4 with a film thickness of 40 nm. The recording layer 5 had its compensation temperature at 25° C. and its Curie temperature at 275° C.

Successively, a mixed gas of argon and nitrogen was introduced thereto, and electric power was supplied to the Al target so that a protective layer 8, made of AlN, was formed on the recording layer 5 with a film thickness of 20 nm under a gas-pressure condition of $4\times10^{-3}$ Torr.

Next, ultraviolet-ray setting resin was applied to the protective layer 8 by a spinner coating method, and an overcoat layer 9 was formed by irradiation with ultraviolet rays.

Thus, sample #1 of the present magneto-optical disk was formed.

(2) Recording and Reproducing Characteristics

The results of measurements carried out on the recording and reproducing characteristics of the present magneto-optical disk are shown as Examples 1 through 3 as follows:

EXAMPLE 1

Figure 6:
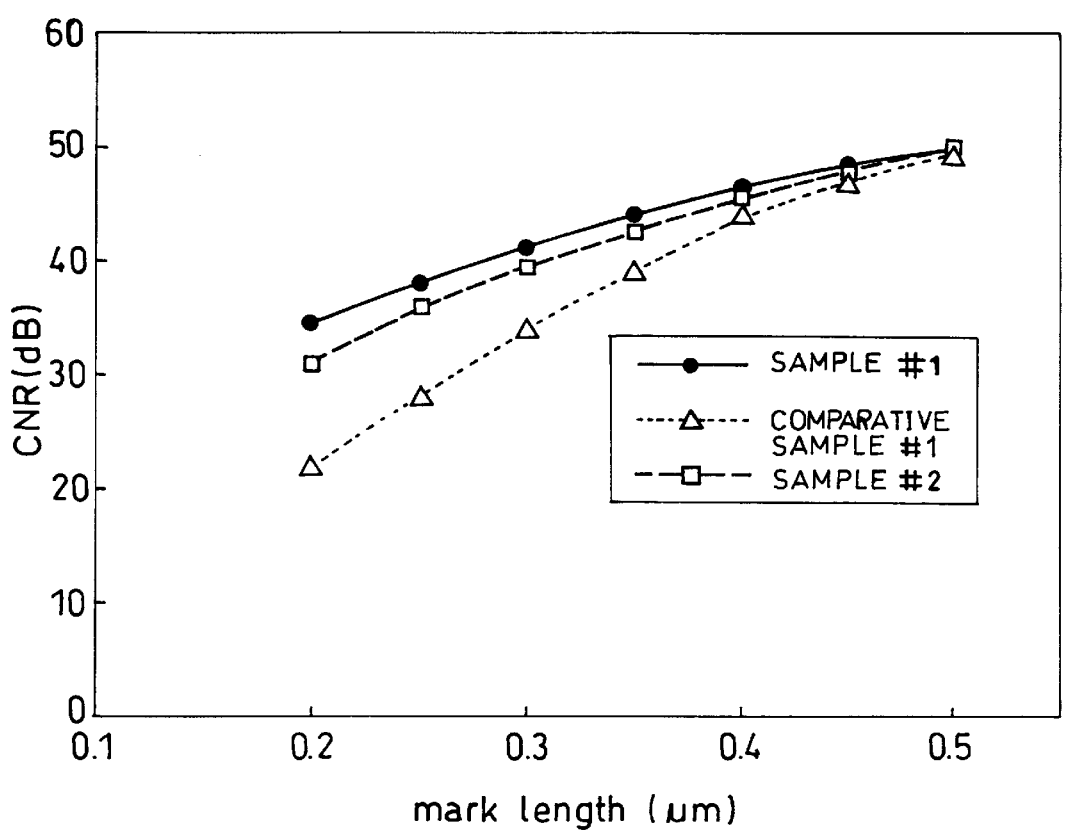
FIG. 6 is a graph that shows the results of measurements on the mark-length dependence of CNR with respect to a sample of the magneto-optical disk shown in FIG. 5 and other samples.

FIG. 6 is a graph showing the results of measurements carried out on the mark-length dependence of CNR (carrier-to-noise ratio) with respect to sample #1 that was fabricated by the formation method of the above-mentioned (1). These measurements were carried out by using an optical pickup having a semiconductor laser with a wavelength of 680 nm.

Moreover, for comparative purposes, this Figure also shows the results of measurements carried out with respect to sample #2 and comparative sample #1. Here, sample #2 was a magneto-optical disk in which the second shielding layer 2 was excluded from the construction of sample #1. Comparative sample #1 was a magneto-optical disk in which the second shielding layer 2 and the first shielding layer 4 were excluded from the construction of sample #1.

In this case, the mark-length dependence of CNR, shown in this figure, is defined as follows: Record bits, each having a length corresponding to a mark length, are continuously formed with recording-magnetic-domain pitches each of which is double the mark length, and the relationship between the CNR and the mark length is found when the record bits are reproduced.

As shown in this Figure, in the case of a mark length of 0.3 μm, the CNR of comparative sample #1 is 34.0 dB, while the CNR of sample #1 is 41 dB, making the CNR of sample #1 greater by 7 dB.

This is because in sample #1, record bits not related to the reproducing operation in the recording layer 5 were masked by the first shielding layer 4 so that the reproducing resolution was improved and because unnecessary leakage magnetic fields toward the reproducing layer 1 were masked by the second shielding layer 2 of sample #1 so that the direction of magnetization had a drastic change at the border area 15 adjacent to the enlarged magnetic domain 13 shown in FIG. 1.

Moreover, samples were formed by excluding the second shielding layer 2 from the construction of the present magnetic-optical disk and varying the film thickness of the first shielding layer 4, and in the case of a mark length of 0.3 μm, CNRs were measured; Table 1 shows the results of the measurements. In Table 1, the result with 0 nm of the second shielding layer 2 and the first shielding layer 4 shows the result of comparative sample #1 with no shielding layers 2 and 4 formed thereon. Further, the result with 0 nm of the second shielding layer 2 and 20 nm of the first shielding layer 4 shows the result of sample #2.

TABLE 1

| Thickness of Reproducing Layer (nm) | Thickness of 2nd Shielding Layer (nm) | Thickness of 1st Shielding Layer (nm) | CNR (dB) |
| --- | --- | --- | --- |
| 20 | 0 | 0 | 34.0 |
| 20 | 0 | 2 | 35.0 |
| 20 | 0 | 5 | 37.5 |
| 20 | 0 | 10 | 38.5 |
| 20 | 0 | 20 | 39.5 |
| 20 | 0 | 30 | 39.5 |
| 20 | 0 | 40 | 35.5 |
| 20 | 0 | 60 | 33.5 |

As shown in this Table, in the construction of the present magneto-optical disk having no second shielding layer 2, even in a construction having a very thin first shielding layer 4 of 2 nm, the CNR is greater by 1 dB than that of comparative sample #1 having no first shielding layer 4 by the effect of the magnetic mask (hereinafter, referred to as the in-plane magnetization mask) exerted by the in-plane magnetization portions in the first shielding layer 4.

Further, as shown in this Table, as the film thickness of the first shielding layer 4 increases, the CNR also increases. This increase results from the fact that as the thickness of the first shielding layer 4 increases, the in-plane magnetization mask of the first shielding layer 4 is strengthened.

However, when the thickness of the first shielding layer 4 exceeds 30 nm, the CNR reduces. This reduction is supposedly due to the facts that the recording layer and the reproducing layer are separated too far from each other, and that the in-plane magnetization mask of the first shielding layer 4 has been strengthened too much to form the magnetic aperture in the first shielding layer 4, thereby failing to form a preferable enlarged magnetic domain in the reproducing layer 1.

Table 1 shows that in order to obtain a CNR higher than that of comparative sample #1, the film thickness of the first shielding layer 4 is preferably set from not less than 2 nm to not more than 40 nm. Moreover, the film thickness of the first shielding layer 4 in sample #1 and sample #2 is set to 20 nm, which is a value for providing the highest CNR as shown in Table 1.

Next, samples were formed by varying the film thickness of the second shielding layer 2 in the construction of sample #1, and in the case of a mark length of 0.3 μm, CNRs were measured; Table 2 shows the results of the measurements. Here, the result with 0 nm of the second shielding layer 2 and 20 nm of the first shielding layer 4 shows result of sample #2. Further, the result with 10 nm of the second shielding layer 2 and 20 nm of the first shielding layer 4 shows result of sample #1.

TABLE 2

| Thickness of Reproducing Layer (nm) | Thickness of 2nd Shielding Layer (nm) | Thickness of 1st Shielding Layer (nm) | CNR (dB) |
| --- | --- | --- | --- |
| 20 | 0 | 20 | 39.5 |
| 20 | 2 | 20 | 40.5 |
| 20 | 5 | 20 | 41.0 |
| 20 | 10 | 20 | 41.0 |
| 20 | 20 | 20 | 40.0 |
| 20 | 40 | 20 | 35.0 |

As shown in this Table, in the construction of sample #1, even in a sample having a very thin second shielding layer 2 of 2 nm, the CNR is greater by 1 dB than that of sample #2 by the effect of the in-plane magnetization mask exerted by the second shielding layer 2.

Further, as shown in this Table, as the film thickness of the second shielding layer 2 increases, the CNR also increases. This increase results from the fact that as the thickness of the second shielding layer 2 increases, the in-plane magnetization mask of the second shielding layer 2 is strengthened.

However, when the thickness of the second shielding layer 2 exceeds 10 nm, the CNR reduces. This reduction is supposedly due to the facts that the recording layer and the reproducing layer are separated too far from each other, and that the in-plane magnetization mask of the second shielding layer 2 has been strengthened too much to form the magnetic aperture in the second shielding layer 2, thereby failing to form a preferable enlarged magnetic domain in the reproducing layer 1.

Table 2 shows that in order to obtain a CNR higher than that of comparative sample #1, the film thickness of the second shielding layer 2 is preferably set to not more than 40 nm. Moreover, the film thickness of the second shielding layer 2 in sample #1 is set at 10 nm, which is a value for providing the highest CNR as shown in Table 2.

Next, samples were formed by varying the film thickness of the producing layer 1 in the construction of sample #1, and in the case of a mark length of 0.3 μm, CNRs were measured; Table 3 shows the results of the measurements.

TABLE 3

| Thickness of Reproducing Layer (nm) | Thickness of 2nd Shielding Layer (nm) | Thickness of 1st Shielding Layer (nm) | CNR (dB) |
| --- | --- | --- | --- |
| 8 | 10 | 20 | 33.0 |
| 10 | 10 | 20 | 34.5 |
| 15 | 10 | 20 | 38.5 |
| 20 | 10 | 20 | 41.0 |
| 30 | 10 | 20 | 40.5 |
| 40 | 10 | 20 | 38.5 |
| 60 | 10 | 20 | 36.5 |
| 80 | 10 | 20 | 34.5 |
| 120 | 10 | 20 | 33.5 |

As shown in this Table, in the case of the reproducing layer 1 having a film thickness of 8 nm, the CNR becomes smaller than that of comparative sample #1 since merely a small reproduced signal is obtained. Moreover, in the case of the reproducing layer 1 having a film thickness of 120 nm, the domain wall energy, generated by the reproducing layer 1, increases, making it impossible to provide a complete perpendicular magnetization state at the portions having a temperature rise (or failing to form a preferable enlarged magnetic domain); therefore, the CNR becomes smaller than that of comparative sample #1.

Table 3 shows that in order to obtain a CNR higher than that of comparative sample #1, the film thickness of the reproducing layer 1 is set in the range of 10 to 80 nm.

Next, in the construction of sample #1, samples were formed by varying the film thickness of the non-magnetic intermediate layer 3, and in the case of a mark length of 0.3 μm CNRs were measured, and the magnetic field required for an erasing operation (the erasing magnetic field) was also measured; Table 4 shows the results of the measurements.

TABLE 4

| Film Thickness of Non-Magnetic Intermediate Layer (nm) | CNR (dB) | Erasing Magnetic Field (kA/m) |
|---|---|---|
| 0.5 | 25.0 | 35 |
| 1 | 43.5 | 32 |
| 4 | 42.0 | 28 |
| 10 | 41.0 | 26 |
| 20 | 41.0 | 24 |
| 30 | 39.0 | 21 |
| 40 | 38.5 | 19 |
| 60 | 36.5 | 16 |
| 80 | 36.0 | 14 |
| 100 | 29.5 | 12 |

As shown in Table 4, in the case of the non-magnetic intermediate layer 3 having a film thickness of 0.5 nm, the CNR extremely reduces. This is supposedly due to the fact that the film thickness of the non-magnetic intermediate layer 3 is too thin to provide a preferable magnetostatical coupling state between the reproducing layer 1 and the recording layer 5.

Moreover, as shown in this Table, in the case of the sample with the non-magnetic intermediate layer 3 having a film thickness of 1 nm, the CNR becomes the greatest. Furthermore, as the film thickness of the non-magnetic intermediate layer 3 increases beyond 1 nm, the CNR decreases. This is supposedly due to the fact that as the non-magnetic intermediate layer 3 becomes thicker, the magnetostatical coupling force exerted between the reproducing layer 1 and the recording layer 5 becomes weaker.

Table 4 shows that in order to obtain a CNR higher than that of comparative sample #1, the film thickness of the non-magnetic intermediate layer 3 is set in the range of 1 to 80 nm.

Furthermore, Table 4 also shows that the erasing magnetic field can be minimized by making the film thickness of the non-magnetic intermediate layer 3 thicker so as to minimize the magnetostatical coupling force between the reproducing layer 1 and the recording layer 5. The range of a practical-use erasing magnetic field is not more than 31 kA/m. Therefore, in order to maintain the erasing magnetic field at not more than 31 kA/m, it is preferable to set the film thickness of the non-magnetic intermediate layer 3 at not less than 4 nm.

EXAMPLE 2

In Example 1, the results of measurements were shown with respect to cases in which $(Gd_{0.11}Fe_{0.89})_{0.5}Al_{0.5}$ whose Curie temperature was 120° C. was used as the first shielding layer 4 in sample #1 and sample #2 or as the second shielding layer 2 in sample #1.

In the present Example, an explanation will be given of cases in which other compositions are used as the second shielding layer 2 or the first shielding layer 4. In particular, in the present Example, the Al contents of the second shielding layer 2 and the first shielding layer 4, which greatly contribute to the masking of the magnetostatical coupling magnetic field (leakage magnetic field) generated from the fine record bits of the recording layer 5, were varied; thus, recording and reproducing characteristics were measured on the respective cases, and an explanation is given of the results.

In the construction of sample #1, samples were formed by excluding the second shielding layer 2 and changing the value of X (composition ratio) in the composition of the first shielding layer 4 represented by $(Gd_{0.11}Fe_{0.98})_xAl_{1-x}$, and in the case of a mark length of 0.3 μm, the CNR was measured; Table 5 shows the results of the measurements. Further, this Table also shows critical temperature T4 (Curie temperature) of each of the compositions of the first shielding layer 4. Here, these CNR measurements were carried out by using an optical pickup having a semiconductor laser with a wavelength of 680 nm. Further, the film thickness of each first shielding layer 4 is 20 nm. Moreover, the result of measurement at X=0.75 in this Table shows the result of measurement on sample #2.

TABLE 5

| X(Composition Ratio) | T4(° C.) | CNR(dB) |
|---|---|---|
| 0.25 | 35 | 34.0 |
| 0.30 | 60 | 35.5 |
| 0.50 | 90 | 37.0 |
| 0.75 | 120 | 39.5 |
| 1.00 | 220 | 37.5 |

Table 5 shows that in order to obtain a CNR higher than the CNR (34.0 dB, see Table 1) of comparative sample #1 having neither the second shielding layer 2 nor the first shielding layer 4, X is preferably set in the range of $0.30 \leq X \leq 1.00$.

As described earlier, the reproducing layer 1 of sample #1 comes to exhibit in-plane magnetization at a temperature of 120° C. Therefore, since the first shielding layer 4 only needs to mask the recording layer 5 with the in-plane magnetization at temperatures not more than 120° C., the optimal value of the Curie temperature (critical temperature T4) of the first shielding layer 4 is 120° C.

However, as shown in Table 5, in the case when critical temperature T4 of the first shielding layer 4 is in the range from not less than 60° C. to not more than 220° C., the CNR of sample #1 is higher than that of comparative sample #1. This shows that the first shielding layer 4 is allowed to form a desired in-plane magnetization mask in the case when critical temperature T4 of the first shielding layer 4 in sample #1 is in the range from not less than 60° C. to not more than 220° C.

In the construction of sample #1, samples were formed by changing the value of X (composition ratio) in the composition of the second shielding layer 2 represented by $(Gd_{0.11}Fe0.89)_xAl_{1-x}$, and in the case of a mark length of 0.3 μm, the CNR was measured; Table 6 shows the results of the measurements. Further, this Table also shows critical temperature T2 (Curie Temperature) of each of the compositions of the second shielding layer 2. Further, the film thickness of each second shielding layer 2 is 20 nm. Moreover, the result of measurement at X=0.50 in this Table shows the result of measurement on sample #1.

TABLE 6

| X(Composition Ratio) | T2(° C.) | CNR(dB) |
|---|---|---|
| 0.25 | 35 | 39.5 |
| 0.30 | 60 | 40.5 |
| 0.50 | 90 | 41.0 |
| 0.75 | 120 | 39.0 |
| 1.00 | 220 | 38.0 |

Table 6 shows that in order to obtain a CNR higher than the CNR (39.5 dB, see Table 5) of sample #2 having no second shielding layer 2, X is preferably set in the range of $0.30 \leq X \leq 0.50$. Further, it is confirmed that the range of X which provides a CNR higher than the CNR (34.0 dB) of comparative sample #1 that has neither the second shielding layer 2 nor the first shielding layer 4 is represented by $0.25 \leq X \leq 1.00$.

Further, as shown in Table 6, in the case when critical temperature T2 of the second shielding layer 2 is in the range from not less than 35° C. to not more than 220° C., it is possible to obtain a CNR higher than that of comparative sample #1. This shows that the second shielding layer 2 is allowed to form a desired in-plane magnetization mask in the case when critical temperature T2 of the first shielding layer 4 is in the range from not less than 35° C. to not more than 220° C.

Moreover, as described above, the reproducing layer 1 comes to exhibit in-plane magnetization at 120° C. Here, with respect to the magnetic domain formed in the reproducing layer 1, it is advantageous from the standpoint of signal characteristics to enlarge it so as to have a size larger than record bit 16a in the recording layer 5 as in the case of the enlarged magnetic domain 13 shown in FIG. 1. For this reason, it is not preferable to allow the second shielding layer 2 to mask the enlarged magnetic domain 13 in the reproducing layer 1 with the in-plane magnetization. Therefore, critical temperature T2 of the second shielding layer 2 is preferably set lower than the Curie temperature of the reproducing layer 1, and more preferably set in the range from not less than 60° C. to not more than 95° C.

Additionally, in Examples 1 and 2, GdFeAl was used as the second shielding layer 2 and the first shielding layer 4, and the results of the measurements were shown. However, the material of the second shielding layer 2 and the first shielding layer 1 is not limited to this material. That is, any material is used as the second shielding layer 2 and the first shielding layer 4, as long as it has the Curie temperature within the range of 60° C. to 220° C. and comes to exhibit in-plane magnetization below the Curie temperature. For example, besides GdFeAl, materials, such as NdFe, NdFeAl, DyFe and DyFeAl, can be used as the material of the second shielding layer 2 and the first shielding layer 4.

EXAMPLE 3

In Examples 1 and 2, the results of measurements were shown with respect to cases in which GdFeAl was used as the first shielding layer 4 in sample #1 and sample #2. In the present Example, an explanation will be given of cases in which other materials are used as the first shielding layer 4.

In the construction of sample #1, $(Gd_{0.11}Fe_{0.89})_{0.75}Z_{0.25}$ was used as the material of the first shielding layer 4 and samples were formed by changing the ingredient corresponding to Z. In the case of a mark length of 0.3 μm, the CNR was measured on these samples; Table 7 shows the results of the measurements. Table 7 also shows critical temperature T4 in each of the materials of the first shielding layer 4.

Here, materials, such as Ti, Ta, Pt, Au, Cu, $Al_{0.5}Ti_{0.5}$ and $Al_{0.5}Ta_{0.5}$, were used as the ingredient Z. Further, the CNR of comparative sample #1 is shown in the uppermost row and the CNR of sample #1 (in which Z is Al) is shown in the second row from the top respectively for comparative purposes. These CNR measurements were carried out by using an optical pickup having a semiconductor laser with a wavelength of 680 nm. Further, the film thickness of each first shielding layer 4 is 20 nm.

TABLE 7

| Z | T4(° C.) | CNR (dB) |
|---|---|---|
| — | — | 34.0 |
| Al | 120 | 41.0 |
| Ti | 115 | 41.5 |
| Ta | 110 | 40.5 |
| pt | 125 | 41.0 |
| Au | 120 | 41.0 |
| Cu | 110 | 40.0 |
| $Al_{0.5}Ti_{0.5}$ | 125 | 41.0 |
| $Al_{0.5}Ta_{0.5}$ | 125 | 40.5 |

Table 7 shows that the CNR is higher than that of comparative sample #1 in all the samples in which Ti, Ta, Pt, Au, Cu, $Al_{0.5}Ti_{0.5}$ and $Al_{0.5}Ta_{0.5}$ are used as Z. Further, the Curie temperature (critical temperature T4) of all the materials for the first shielding layer 4 is maintained within the range of 60° C. to 220° C., which is a desired range for the Curie temperature of the first shielding layer 4 (see Example 2).

In addition, materials, such as NdFeTi, NdFeTa, DyFeTi and DyFeTa, may be used as the material of the first shielding layer 4.

EMBODIMENT 2

The following description will discuss the second embodiment of the present recording medium. Here, in the present embodiment, those members that have the same functions and that are described in embodiment 1 are indicated by the same reference numerals and the description thereof is omitted.

Figure 7:
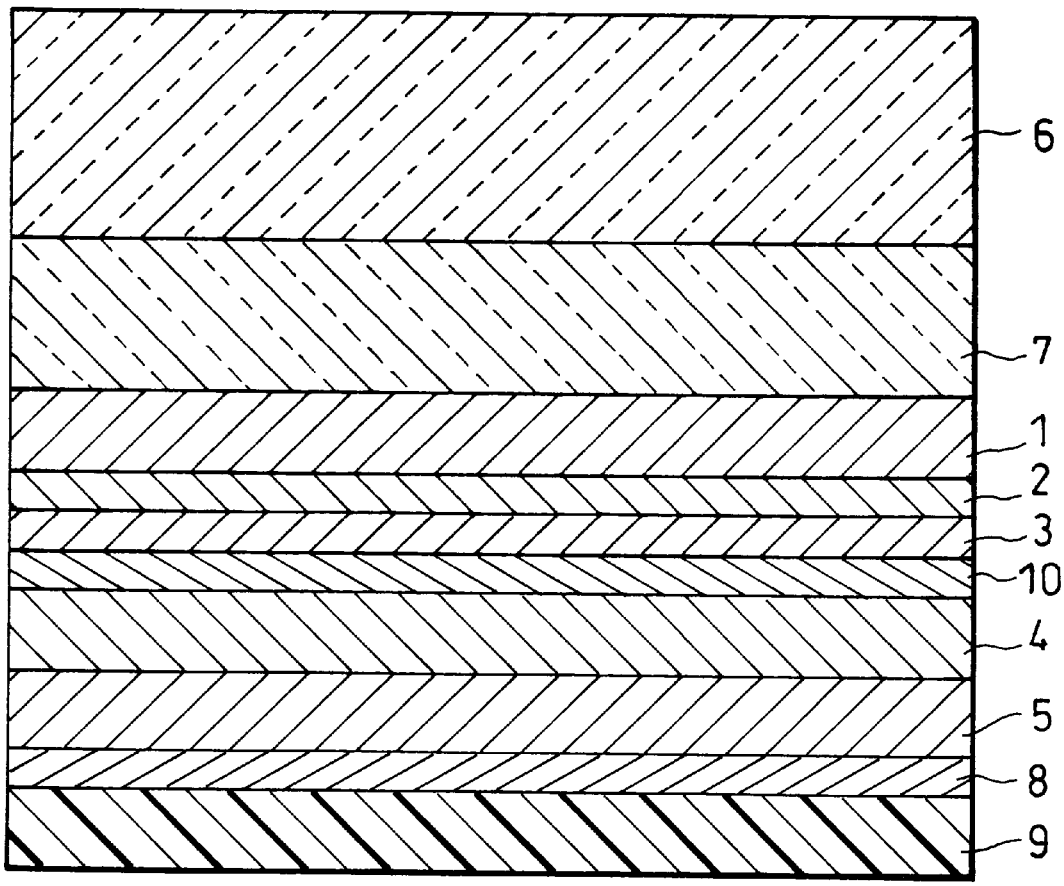
FIG. 7 is an explanatory drawing that shows the construction of a magneto-optical disk in accordance with the second embodiment of the present invention.

FIG. 7 is an explanatory drawing that shows the construction of a magneto-optical disk (hereinafter, referred to as the present magneto-optical disk) which is the second embodiment of the present recording medium. As illustrated in this Figure, the present magneto-optical disk has a construction in which a reflection layer 10 is interpolated between the non-magnetic intermediate layer 3 and the first shielding layer 4 in the construction of the magneto-optical disk shown in FIG. 5.

In the magneto-optical disk as shown in FIG. 5, for example, when the film thickness of the first shielding layer 4 is set smaller than 10 nm, a light beam 9, which has passed through the reproducing layer 1 and the non-magnetic intermediate layer 3, is reflected by the recording layer 5. Since the light reflected by the recording layer 5 mixes with the reflected light that is to be received by the optical pickup, the reproduced signal is subjected to intervention of unnecessary information, resulting in degradation in the quality of the reproduced signal.

In order to solve this problem, the present magneto-optical disk is provided with the reflection layer 10 between the non-magnetic intermediate layer 3 and the first shielding layer 4. With this arrangement, the light beam that has passed through the reproducing layer 1 is reflected by the reflection layer 10, and is not allowed to reach the recording layer 5. Therefore, no reflected light from the recording layer 5 is allowed to enter the optical pick up so that it becomes possible to prevent degradation in the quality of the reproduced signal.

For example, Al is used as the reflection layer 10. Further, the film thickness of the reflection layer 10 is preferably set in the range of 2 to 80 nm.

With respect to specific examples of the magneto-optical disk of the present embodiment, their formation method (1)

and recording and reproducing characteristics (2) are described separately as follows:

(1) Formation Method

The following description will discuss a formation method of the present magneto-optical disk with the above-mentioned arrangement. The following formation method is one example of formation methods of the present magneto-optical disk. The present magneto-optical disk formed in this example is referred to as sample #11.

In the formation method of sample #11, a reflection layer 10 made of Al is formed between the non-magnetic intermediate layer 3 and the first shielding layer 4 in the similar formation method of sample #1 shown in Embodiment 1, wherein the film thickness of the reproducing layer 1 is set at 15 nm, the film thickness of the second shielding layer is set at 5 nm, and the film thickness of the first shielding layer 4 is set at 10 nm.

In other words, in sample #11, the compositions and formation methods of the substrate 6, the transparent dielectric layer 7, the non-magnetic intermediate layer 3, the recording layer 5, the protective layer 8 and the overcoat layer 9 are the same as those of sample #1. Further, the formation methods of the reproducing layer 1, the second shielding layer 2 and the first shielding layer 4 of sample #11 are the same as those of sample #1 except for their film thicknesses.

After the non-magnetic intermediate layer 3 has been formed, the reflection layer 10 is stacked on the non-magnetic intermediate layer 3. In other words, after the formation of the non-magnetic intermediate layer 3, the sputtering device was evacuated to $1 \times 10^{-6}$ Torr, argon gas was introduced thereto, and electric power was supplied to the Al target so that a reflection layer 10 in sample #11, made of Al, was formed on the non-magnetic intermediate layer with a film thickness of 20 nm under a gas-pressure condition of $4 \times 10^{-3}$ Torr.

(2) Recording and Reproducing Characteristics

The results of measurements carried out on the recording reproducing characteristics of the present magneto-optical disk are shown as Examples 4 through 6 as follows:

EXAMPLE 4

Samples were formed by varying the film thickness of the reflection layer 10 in the construction of sample #11, and in the case of a mark length of 0.3 μm, CNRs were measured; Table 8 shows the results of the measurements. Here, the measurements were carried out by using an optical semiconductor laser with a wavelength of 680 nm. Further, comparative sample #3 which had no reflection layer 10 in the construction of sample #11 was prepared for comparatives purposes, and the result of measurements carried out on this sample is shown in the uppermost row in Table 8.

TABLE 8

| Film Thickness of Reflection Layer(nm) | CNR (dB) |
|---|---|
| 0 | 38.5 |
| 2 | 39.5 |
| 5 | 40.0 |
| 10 | 41.0 |
| 20 | 42.0 |
| 30 | 41.0 |
| 40 | 38.0 |
| 50 | 34.0 |

As shown in this Table, even in the sample having a very thin reflection layer 10 of 2 nm, the CNR is greater by 1dB than that of comparative sample #3 by the effect of the information-reproduction shielding (reflected light shielding) effect from the recording layer 5.

As the film thickness of the reflection layer 10 increases, the CNR gradually increases and has a maximum at the film thickness of 20 nm. This is because the effect of the information-reproduction shielding from the recording layer 5 becomes greater as the film thickness of the reflection layer 10 increases.

Moreover, in the samples having the film thickness not less than 30 nm, the CNR decreases. This is due to the fact that as the distance between the recording layer 5 and the reproducing layer 1 increases, the magnetostatic coupling force, exerted between them, becomes weaker.

Here, FIG. 8 shows that in order to obtain a CNR higher than that of comparative sample #3, the film thickness of the reflection layer 10 is preferably set from not less than 2 nm to not more than 30 nm. Further, in order to obtain a CNR higher than the CNR (34.0 dB) of comparative sample #1 shown in embodiment 1 and other embodiments, the range of the film thickness of the reflection layer 10 is preferably set at not more than 40 nm.

EXAMPLE 5

In the present example, an explanation will be given of cases in which materials different from Al were used as the reflection layer 10 of the sample #11.

In Example 4, the explanation was given of the reproducing characteristics of the present magneto-optical disk having a construction in which Al was used as the reflection layer 10. In the present example, in order to improve the recording characteristics of the present magneto-optical disk, alloys of Al and metals other than Al were used as the reflection layer 10, and the results of measurements on the CNR will be described.

In the construction of sample #11, samples were formed by changing the value of X (composition ratio) in the composition of the reflection layer 10 defined by $Al_{1-x}Fe_x$, and the CNR was measured with a mark length of 0.3 μm and the erasing magnetic field was measured; Table 9 shows the results of the measurements.

Here, these CNR measurements were carried out by using an optical pickup having a semiconductor laser with a wavelength of 680 nm. Further, the film thickness of the reflection layer 10 in each of the samples was 20 nm.

TABLE 9

| X (Compo. Ratio) | CNR (dB) | Erasing Magnetic Field (kA/m) |
|---|---|---|
| 0.00 | 42.0 | 50 |
| 0.02 | 42.0 | 17 |
| 0.05 | 42.0 | 16 |
| 0.10 | 42.0 | 17 |
| 0.25 | 41.0 | 18 |
| 0.50 | 39.5 | 30 |
| 0.60 | 39.5 | 58 |

Table 9 shows that as the content of Fe increases with X becoming greater than 0.10, the CNR gradually decreases. However, in any of the measurements, CNRs that are greater than the CNR of comparative sample #3 shown in Table 8 are obtained, which indicates the effect of formation of the reflection layer 10.

Moreover, as shown in Table 9, in the case of the reflection layer 10 made of pure Al, a great erasing magnetic field of 50 kA/m is required. However, by setting X from not less than 0.02 to not more than 0.50, the erasing magnetic field can be set at a practical range of not more than 31 kA/m.

Next, in the construction of sample #11, samples were formed by changing the value of X (composition ratio) in the composition of the reflection layer 10 defined by $Al_{1-x}Ni_x$, and the CNR was measured with a mark length of 0.3 μm, and the erasing magnetic field was measured; Table 10 shows the results of the measurements. Here, these CNR measurements were carried out by using an optical pickup having a semiconductor laser with a wavelength of 680 nm. Further, the film thickness of the reflection layer 10 in each of the samples was 20 nm.

Table 10

| X (Compo. Ratio) | CNR (dB) | Erasing Magnetic Field (kA/m) |
| --- | --- | --- |
| 0.00 | 42.0 | 50 |
| 0.02 | 42.5 | 15 |
| 0.05 | 41.0 | 16 |
| 0.10 | 40.5 | 18 |
| 0.25 | 40.0 | 18 |
| 0.50 | 39.5 | 28 |
| 0.60 | 39.5 | 62 |

Table 10 shows that as in the case of the reflection layer 10 containing Fe, by setting X in the range from not less than 0.02 to not more than 0.50, the erasing magnetic field can be set at a practical range of not more than 31 kA/m.

Besides Fe and Ni, magnetic metals, such as Co, Gd, Tb, Dy and Nd, can be contained in Al in the same manner so as to reduce the erasing magnetic field.

EXAMPLE 6

In the present example, an explanation will be given of cases in which other different materials were used as the reflection layer 10 of the present magneto-optical disk.

In Example 5, the results of measurements carried out on the reflection layer 10 in which magnetic metal elements were contained in Al were shown. In the present example, an explanation will be given of the improvements of the recording characteristics of the present magneto-optical disk, in the case when materials made of Al containing non-magnetic metal elements were used as the reflection layer 10.

In the construction of sample #11, samples were formed by changing the value of X (composition ratio) in the composition of the reflection layer 10 defined by $Al_{1-x}Ti_x$, and the CNR was measured with a mark length of 0.3 μm and the erasing magnetic field was measured; Table 11 shows the results of the measurements. Here, these CNR measurements were carried out by using an optical pickup having a semiconductor laser with a wavelength of 680 nm. Further, the film thickness of the reflection layer 10 in each of the samples was 20 nm.

TABLE 11

| X (Compo. Ratio) | CNR (dB) | Erasing Magnetic Field (kA/m) |
| --- | --- | --- |
| 0.00 | 41.5 | 50 |
| 0.02 | 41.5 | 15 |
| 0.05 | 41.0 | 16 |
| 0.10 | 41.0 | 18 |
| 0.25 | 41.5 | 17 |
| 0.50 | 41.0 | 15 |
| 0.75 | 40.5 | 17 |
| 0.90 | 40.0 | 16 |
| 0.95 | 39.5 | 17 |
| 0.98 | 39.5 | 15 |
| 1.00 | 38.5 | 48 |

Table 11 shows that as the content of Ti increases with X becoming greater than 0.10, the CNR gradually decreases. However, in any of the measurements, CNRs that are greater than the CNR of comparative sample #3 shown in Table 8 are obtained, which indicates the effect of formation of the reflection layer 10.

Moreover, in the case of the reflection layer 10 made of pure Al, a great erasing magnetic field of 50 kA/m is required. However, by setting X in the range from not less than 0.02 to not more than 0.98, the erasing magnetic field can be set at a practical range of not more than 31 kA/m.

Next, Table 12 indicates the reducing effect on the erasing magnetic field in the case when non-magnetic elements other than Ti were contained in Al so as to form the reflection layer 10. In other words, in the construction of sample #11, samples were formed by changing Z in the material of the reflection layer 10 represented by $Al_{0.5}Z_{0.5}$, and the CNR was measured with a mark length of 0.3 μm and the erasing magnetic field was measured; Table 12 shows the results of the measurements. Here, non-magnetic metals other than Ti, such as Ta, Pt, Au, Cu and Si, were used as Z. Further, the CNR measurements were carried out by using an optical pickup having a semiconductor laser with a wavelength of 680 nm. Moreover, the film thickness of the reflection layer 10 in each of the samples was 20 nm.

TABLE 11

| Z | CNR (dB) | Erasing Magnetic Field (kA/m) |
| --- | --- | --- |
| Ta | 39.5 | 15 |
| Pt | 41.5 | 16 |
| Au | 41.5 | 15 |
| Cu | 40.5 | 17 |
| Si | 40.5 | 16 |

Table 12 shows that in all the cases in which Ta, Pt, Au, Cu and Si are used as Z, the CNR greater than that of comparative sample #3 is obtained, which indicates the effect of the formation of the reflection layer 10. Moreover, it is found that in the same manner as the case of Al containing Ti, the erasing magnetic field reduces in all the samples.

EMBODIMENT 3

The following description will discuss the third embodiment of the present recording medium. Here, in the present embodiment, those members that have the same functions and that are described in embodiments 1 and 2 are indicated by the same reference numerals and the description thereof is omitted.

A magneto-optical disk (hereinafter, referred to as the present magneto-optical disk), which is the third embodiment of the present recording medium, has a construction in which, in the construction of the magneto-optical disk shown in FIG. 5, a magnetic film, which exhibits in-plane magnetization at room temperature and comes to exhibit perpendicular magnetization at temperatures not less than critical temperature T4, is provided as the first shielding layer 4.

Samples of the present magneto-optical disk were formed as sample #21, and an explanation will be given on the results of the measurements carried out on their recording and reproducing characteristics as Example 7.

EXAMPLE 7

Sample #21 has a construction in which in the construction of sample #1, a magnetic film, which is made of $Gd_{0.30}(Fe_{0.90}Co_{0.10})_{0.70}$ with a film thickness of 20 nm, is provided as the first shielding layer 4. Thus, the first shielding layer 4, provided as the magnetic film, exhibits in-plane magnetization at room temperature, comes to exhibit perpendicular magnetization at temperatures not less than critical temperature T4 (=120° C.), and has its Curie temperature at 250° C.

With respect to sample #21, in the case of a mark length of 0.3 μm, the CNR was measured by using an optical pickup having a semiconductor laser with a wavelength of 680 nm, and the magnitude of the erasing magnetic field was also measured; and the results showed that the value of the CNR was 41.5 dB and the erasing magnetic field was 35.0 kA/m.

As described above, in sample #21 the erasing magnetic field is greater as compared with sample #1. However, the CNR of sample #21 is greater than that of sample #1 by 0.5 dB, and also greater than that of comparative sample #1 by 7.5 dB.

The reasons for these measurement results are explained as follows:

In portions having temperatures not more than critical temperature T4 in sample #21, the recording layer 5 is magnetically masked with the in-plane magnetization of the first shielding layer 4 in the same manner as sample #1.

In contrast, in portions having temperatures not less than critical temperature T4, the magnetization of record bit 16a (see FIG. 1) to be reproduced in the recording layer 5 is exchange-coupled with the magnetization in aperture 18 (see FIG. 1) formed in the first shielding layer 4, and is copied on aperture 18. Then, the first shielding layer 4 and the reproducing layer 1 is magneto-statically coupled by the leakage magnetic field generated by aperture 18.

For this reason, in sample #21, a leakage magnetic field is generated from portions closer to the reproducing layer 1 as compared with sample #1. Further, in sample #21, the magnetization of record bit 16a and the magnetization in aperture 18 of the first shielding layer 4 are exchange-coupled. Consequently, the magnetization of aperture 18 is oriented in the same direction as the magnetization of record bit 16a. Therefore, the leakage magnetic field in sample #21 is greater as compared with sample #1.

In other words, as compared with sample #1, the reproducing layer 1 in sample #21 is subject to a greater leakage magnetic field from closer portions. For this reason, it is considered that the CNR of sample #21 becomes greater than that of sample #1.

Moreover, in sample #21, even during a recording operation, the recording layer 5 and the first shielding layer 4 are exchange-coupled at the center of a beam spot (the portion having a temperature higher than critical temperature T4) in the same manner as the reproducing operation. Consequently, the erasing magnetic field of sample #21 is greater than that of sample #1.

As described above, the first shielding layer 4 of sample #21 masks the magnetization of the recording layer 5 at low-temperature portions, while the magnetization in aperture 18 at high-temperature portions copies the magnetization of record bit 16a in the recording layer 5 by the exchange coupling. Thus, sample #21 transmits a greater leakage magnetic field to the reproducing layer 1 than sample #1. Therefore, sample #21 makes the CNR greater as compared with sample #1.

Additionally, in embodiments 2 and 3, the reflection layer 10 is provided so as to prevent the light beam from reaching the recording layer 5; however, the construction of the reflection layer 10 is not intended to be limited thereby. The reflection layer 10 may be constructed so that the light beam is allowed to reach the recording layer 5, while the light reflected from the recording layer 5 is not allowed to pass through it.

In the above-mentioned Embodiments 1 through 3 and Examples 1 through 7, a magnetic film, which exhibits in-plane magnetization at room temperature, and comes to exhibit perpendicular magnetization at high temperatures, is used as the reproducing layer 1. However, the construction of the reproducing layer 1 is not limited by this construction; and any construction may be used as long as at least a signal-reproducing area (an area that is heated above a predetermined temperature (a reproducing temperature) during the reproducing operation) comes to exhibit perpendicular magnetization.

Moreover, as described in Embodiments 1 through 3 and Examples 1 through 7, when the reproducing layer 1 exhibits in-plane magnetization at room temperature, unnecessary information is not reproduced. In other words, perpendicular magnetization, if exerted at portions other than the enlarged magnetic domain 13 formed in the reproducing layer, all tends to produce noise. Therefore, the application of the magnetic layer that exhibits in-plane magnetization at room temperature as the reproducing layer 1 allows only the enlarged magnetic domain 13 to exhibit perpendicular magnetization, thereby making it possible to reduce noise in the reproducing signal.

Moreover, in Embodiments 1 through 3 and Examples 1 through 7, a magnetic layer, which exhibits in-plane magnetization at temperatures less than critical temperature T4, is used as the first shielding layer 4; however, the construction of the first shielding layer 4 is not limited thereby. Any perpendicular magnetization film, in which the direction of the sublattice magnetization of its transition metal is oriented opposite to the direction of the record bit of the recording layer 5 at temperatures not more than critical temperature T4, may be used as the first shielding layer 4.

Moreover, in Embodiments 1 through 3 and Example 1 through 7, the first shielding layer 4 is formed adjacent to the recording layer 5 so that it is exchange-coupled with the recording layer 5 at areas having temperatures not more than critical temperature T4. However, a non-magnetic intermediate layer like the non-magnetic intermediate layer 3 may be placed between the first shielding layer 4 and the recording layer 5 so that the first shielding layer 4 and the recording layer 5 are magnetostatically coupled with each other at areas having temperatures not more than critical temperature T4. This construction makes it possible to enhance the masking effect of the first shielding layer 4.

Moreover, in Embodiments 1 through 3 and Examples 1 through 7, the second shielding layer 2 is formed adjacent to the reproducing layer 1 so that it is exchange-coupled with the reproducing layer 1 at areas having temperatures not more than critical temperature T2. However, a non-magnetic intermediate layer like the non-magnetic intermediate layer 3 may be placed between the second shielding layer 2 and the reproducing layer 1 so that the second shielding layer 2 and the reproducing layer 1 are magnetostatically coupled with each other at areas having temperatures not more than critical temperature T2. This construction makes it possible to enhance the masking effect of the second shielding layer 2.

Furthermore, in the construction as shown in FIG. 5 or FIG. 10, an auxiliary recording layer may be placed between the recording layer 5 and the protective layer 6. For example, a perpendicular magnetization film, whose Curie temperature is higher than that of the recording layer 5 and which is inverted in magnetization under a magnetic field lower than the recording layer 5 is, may be used as the auxiliary recording layer. In this construction, upon recording, the magnetization of the auxiliary recording layer is inverted so that an exchange-coupling force exerted by the auxiliary recording layer is utilized to invert the magnetization of the recording layer 5; thus, it becomes possible to carry out a recording operation using a weaker magnetic field.

Moreover, in Embodiments 1 through 3 and Examples 1 through 7, the second shielding layer 2 is designed so that it exhibits in-plane magnetization from room temperature to critical temperature T2 and has its magnetization disappeared or extremely minimized at temperatures not less than T2; however, the construction of the second shielding layer 2 is not intended to be limited to this construction. Any magnetic layer may be used as the second shielding layer 2 as long as it masks the unnecessary portions in the reproducing layer 1.

In the above-mentioned explanation, the magnetization of record bit 16a in the recording layer 5 is copied onto the reproducing layer 1; however, the magnetization direction of record bit 16a may be copied thereon.

As described above, the first magneto-optical recording medium of the present invention, which is a magneto-optical recording medium that has at least a reproducing layer that allows a signal reproducing area to exhibit perpendicular magnetization and a perpendicular magnetization film that is magnetostatically coupled with the reproducing layer, is provided with: a first magnetic masking layer that is placed between the recording layer and the reproducing layer so as to suppress leakage of magnetic fluxes from the recording layer to the reproducing layer at least at room temperature; and a second magnetic masking layer that is placed between the recording layer and the first magnetic masking layer so as to suppress leakage of magnetic fluxes from the recording layer to the reproducing layer at least at room temperature.

In the construction of the first magneto-optical recording medium, the first and second magnetic masking layers are formed between the recording layer and the reproducing layer. Here, the second masking layer suppresses magnetization from reaching the recording layer to the reproducing layer at least at room temperature. Consequently, upon reproduction, the influence of magnetization from adjacent recording magnetic domains can be eliminated so that it becomes possible to acquire only information from a desired recording magnetic domain.

Further, the first magnetic masking layer suppresses unnecessary magnetic fluxes from reaching a reproducing magnetic domain in the reproducing layer. Moreover, since it is possible to suppress instable magnetization in terms of directions in the reproducing layer, the recording density can be increased. Thus, it becomes possible to carry out recording and reproducing operations using a smaller bit diameter and smaller recording bit intervals.

Moreover, in the second magneto-optical recording medium of the present invention that has the same construction as the first magneto-optical recording medium, the area of a recording magnetic domain in the recording layer is set smaller than the area of a stable magnetic domain of the reproducing layer.

With the construction of the second magneto-optical recording medium, since the area of the stable magnetic domain of the reproducing layer is larger than the area of the recording magnetic domain, it becomes possible to increase the amount of a reproduced signal, and consequently to improve the quality of the reproduced signal.

Moreover, in the third magneto-optical recording medium of the present invention that has the same construction as the first or the second magneto-optical recording medium, the first magnetic masking layer is constituted by a magnetic layer that exhibits in-plane magnetization at least at room temperature and that has its magnetization disappeared or reduced when heated to not less than a predetermined temperature.

With the construction of the third magneto-optical, since the in-plane magnetization layer is used as the first magnetic masking layer, the magnetic field generated from the recording layer is absorbed at room temperature so that it is possible to block the magnetic field from the recording layer in the recording layer.

In contrast, when heated by irradiation of a reproducing laser beam, the magnetization of the first magnetic masking layer reduces, with the result that the blocking effect of the magnetic field is no longer exerted. Therefore, at the heated area of the first magnetic masking layer, the magnetic flux from the recording layer is allowed to leak to the reproducing layer so that it becomes possible to allow the reproducing layer to exhibit perpendicular magnetization corresponding to recording information.

Therefore, noise components from unnecessary portions of the reproducing layer (portions outside of the area at which a stable magnetic domain is formed by the magnetization from the target recording magnetic domain) can be suppressed; therefore, even in the case of recording and reproducing operations using a smaller record bit diameter and smaller record bit intervals, it is possible to obtain a sufficient reproduced signal.

Moreover, in the fourth magneto-optical recording medium of the present invention that has the same construction as the third magneto-optical recording medium, the first magnetic masking layer is formed adjacent to the reproducing layer.

When the first magnetic masking layer in the third magneto-optical recording medium is made adjacent to the reproducing layer, the direction of magnetization generated from unnecessary portions of the reproducing layer (portions outside of the area at which a stable magnetic domain is formed by the magnetization from the target recording magnetic domain) can be fixed to a direction in parallel with the film surface; thus, it becomes possible to suppress the generation of noise.

Moreover, in the fifth magneto-optical recording medium that has the same construction as the third or the fourth magneto-optical recording medium, the second magnetic masking layer is constituted by a magnetic layer that exhibits in-plane magnetization at room temperature and that has its magnetization disappeared or reduced when heated to not less than a predetermined temperature, and the Curie temperature of the first magnetic masking layer is the same as or less than the Curie temperature of the second magnetic masking layer.

With the construction of the fifth magneto-optical recording medium, since the Curie temperature of the first magnetic masking layer is the same as or less than the Curie temperature of the second magnetic masking layer, areas (apertures) at which magnetization is not masked during reproduction are formed in such a manner that the area on the reproducing layer becomes larger than the area on the recording layer. Therefore, the magnetic-domain enlarging reproduction, which increases the size of the magnetic domain produced on the reproducing layer, can be carried out smoothly.

Furthermore, in the sixth magneto-optical recording medium that has a construction similar to the fifth magneto-optical recording medium, a transparent dielectric layer, the reproducing layer, the first magnetic masking layer, a non-magnetic intermediate layer, the second magnetic masking layer, the recording layer and a protective layer are successively formed on the magneto-optical disk substrate.

When the transparent dielectric layer, the reproducing layer, the first magnetic masking layer, the non-magnetic intermediate layer, the second magnetic masking layer, the recording layer and the protective layer are successively formed on the magneto-optical disk substrate, one portion of bit information recorded on the recording layer in a small form is selected by the magnetic mask by the second magnetic masking layer, masked by the first magnetic masking layer on the way to the reproducing layer, and reproduced in a greatly enlarged manner by the magnetic domain of the reproducing layer; thus, it becomes possible to obtain a sufficiently greater signal intensity even in the case of high-density recording.

Moreover, the non-magnetic intermediate layer completely blocks the exchange coupling between the first magnetic masking layer and the second magnetic masking layer, thereby making it possible to achieve desired magnetostatical coupling between the reproducing layer and the first magnetic masking layer as well as between the second magnetic masking layer and the recording layer.

Furthermore, in the seventh magneto-optical recording medium of the present invention that has the same construction as the sixth magneto-optical recording medium, the film thickness of the first magnetic masking layer is set at not more than 20 nm, and the film thickness of the second magnetic masking layer is set from not less than 2 nm to not more than 40 nm.

In the sixth magneto-optical recording medium, when the film thickness of the first magnetic masking layer is set at not more than 20 nm and the film thickness of the second magnetic masking layer is set from not less than 2 nm to not more than 40 nm, it is possible to set the masking effect on the recording layer by the respective magnetic masking layers in a preferable manner. Further, it becomes possible to carry out a stable magnetic-domain enlarging reproduction.

Moreover, in the eighth magneto-optical recording medium of the present invention that has the same construction as the sixth or the seventh magneto-optical recording medium, the Curie temperature of the first magnetic masking layer is set from not less than 30° C. to not more than 180° C. and the Curie temperature of the second magnetic masking layer is set from not less than 60° C. to not more than 220° C.

In the sixth or the seventh magneto-optical recording medium, when the Curie temperature of the first magnetic masking layer is set from not less than 30° C. to not more than 180° C. and the Curie temperature of the second magnetic masking layer is set from not less than 60° C. to not more than 220° C., the Curie temperatures of the two shielding layers can be optimized. Consequently, at temperatures not more than the Curie temperature of the second magnetic masking layer, the magnetization of the recording layer is magnetically masked by its in-plane magnetization, while at temperatures not less than the Curie temperature of the second magnetic masking layer, only a magnetic flux from the target record bit is allowed to pass from the recording layer.

Further, on the reproducing layer side, at temperatures not more than the Curie temperature of the first magnetic masking layer, magnetic fluxes having unnecessary directions are magnetically masked by the in-plane magnetization, while at temperatures not less than the Curie temperature of the first magnetic masking layer, a magnetic flux from the target record bit is allowed to pass.

In this case, in the vicinity of the transition temperature at which the magnetization direction of the reproducing layer changes, the direction of the magnetization is instable. For this reason, the magnetization direction is aligned in the in-plane direction and magnetic fluxes having unnecessary directions are blocked, by the coupling change with the in-plane magnetization of the first magnetic masking layer. The effects of these arrangements preferably maintain the magnetostatical coupling between the recording layer and the reproducing layer, thereby making it possible to achieve a stable magnetic-domain enlarging reproduction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:
    a recording layer that is made of a perpendicular magnetization film and that has record bits for recording information;
    a reproducing layer that is maintained in a perpendicular magnetization state in a signal-reproducing region so as to copy the magnetization of each record bit on the recording layer onto said region; and
    a shielding layer formed between the recording layer and the reproducing layer, the shielding layer having its magnetization disappear at a first portion that corresponds to the signal-reproducing region in the reproducing layer and maintaining an in-plane magnetization state in a first portion that is a portion other than the first portion,
    wherein the signal-reproducing region of the reproducing layer is larger than the record bit in the recording layer, and a region of the reproducing layer, other than the signal-reproducing region, exhibits in-plane magnetization when it is magnetically coupled with the first portion of the shielding layer.

2. The magneto-optical recording medium in accord with claim 1, wherein a region other than the signal reproducing region of the reproducing layer and the first portion of the first shielding layer are exchange-coupled.

3. The magneto-optical recording medium in accord with claim 1, further comprising:

a second shielding layer, formed between the recording layer and the reproducing layer, for preventing magnetizations of recorded bits other than the selected record bit in the recording layer to be reproduced from being copied on the reproducing layer.

4. The magneto-optical recording medium as defined in claim 1, wherein the second shielding layer has its magnetization disappeared at a third portion that corresponds to the record bit to be reproduced, while it exhibits in-plane magnetization at a fourth portion that is a portion other than the third portion.

5. The magneto-optical recording medium as defined in claim 4, wherein the magnetization of the fourth portion in the second shielding layer is greater than the magnetization of the record bit in the recording layer that corresponds to the fourth portion.

6. The magneto-optical recording medium as defined in claim 4, wherein the third portion in the second shielding layer has a size not more than the record bit in the recording layer.

7. The magneto-optical recording medium as defined in claim 4, wherein the second shielding layer exhibits in-plane magnetization from room temperature to the Curie temperature.

8. The magneto-optical recording medium as defined in claim 7, wherein the Curie temperature of the second shielding layer is lower than the Curie temperature of the recording layer.

9. The magneto-optical recording medium as defined in claim 8, wherein the Curie temperature of the second shielding layer is set from not less than 60° C. to not more than 220° C.

10. The magneto-optical recording medium as defined in claim 9, wherein the second shielding layer is made of any one material selected from the group consisting of GdFeAl, GdFeTi, GdFeTa, GdFePt, GdFeAu, GdFeCu, GdFeAlTi, GdFeAlTa, NdFe, NdFeAl, NdFeTi, NdFeTa, DyFeAl, DyFeTi, DyFeTa and DyFe.

11. The magneto-optical recording medium as defined in claim 10, wherein the second shielding layer is made of an alloy represented by $(Gd_{0.11}Fe_{0.89})_{0.75}Z_{0.25}$, where Z is any one material selected from the group consisting of Ti, Ta, Pt, Au, Cu, $Al_{0.5}Ti_{0.5}$ and $Al_{0.5}Ta_{0.5}$.

12. The magneto-optical recording medium as defined in claim 10, wherein the second shielding layer is made of an alloy represented by $(Gd_{0.11}Fe_{0.89})_{x1}Al_{1-x}$, where X1 is in the range of $0.3 \leq X1 \leq 1.00$.

13. The magneto-optical recording medium as defined in claim 1, wherein the second shielding layer is formed adjacent to the recording layer.

14. The magneto-optical recording medium as defined in claim 1, wherein the second shielding layer exhibits in-plane magnetization from room temperature to a predetermined critical temperature, and also exhibits perpendicular magnetization from the critical temperature to the Curie temperature.

15. The magneto-optical recording medium as defined in claim 14, wherein the Curie temperature of the second shielding layer is lower than the Curie temperature of the recording layer.

16. The magneto-optical recording medium as defined in claim 1, wherein from room temperature to the Curie temperature, the second shielding layer exhibits perpendicular magnetization which is reversed to the magnetization of the recording layer.

17. The magneto-optical recording medium as defined in claim 4, wherein the first shielding layer exhibits in-plane magnetization from room temperature to the Curie temperature.

18. The magneto-optical recording medium as defined in claim 17, wherein the Curie temperature of the first shielding layer is set from not less than 35° C. to not more than 220° C.

19. The magneto-optical recording medium as defined in claim 18, wherein the first shielding layer is made of any one material selected from the group consisting of GdFeAl, NdFe, NdFeAl, DyFe, DyFeAl.

20. The magneto-optical recording medium as defined in claim 19, wherein the first shielding layer is made of an alloy represented by $(Gd_{0.11}Fe_{0.89})_{X2}Al_{1-X2}$, where X2 is in the range of $0.25 \leq X2 \leq 1.00$.

21. The magneto-optical recording medium as defined in claim 17, wherein the Curie temperature of the first shielding layer is not more than the Curie temperature of the second shielding layer.

22. The magneto-optical recording medium as defined in claim 4, wherein the first shielding layer is formed adjacent to the reproducing layer.

23. The magneto-optical recording medium as defined in claim 4, wherein the first portion in the first shielding layer, which corresponds to the signal reproducing region of the reproducing layer, has a size not less than the third portion in the second shielding layer.

24. The magneto-optical recording medium as defined in claim 4, wherein a transparent dielectric layer, the reproducing layer, the first shielding layer, a non-magnetic intermediate layer, the second shielding layer, the recording layer and a protective layer are successively formed on a substrate in this order.

25. The magneto-optical recording medium as defined in claim 24, wherein the second shielding layer has a film thickness of not more than 40 nm.

26. The magneto-optical recording medium as defined in claim 25, wherein the first shielding layer has a film thickness of not more than 20 nm.

27. The magneto-optical recording medium as defined in claim 26, wherein the reproducing layer has a film thickness from not less than 10 nm to not more than 80 nm.

28. The magneto-optical recording medium as defined in claim 27, wherein the non-magnetic intermediate layer has a film thickness from not less than 1 nm to not more than 80 nm.

29. The magneto-optical recording medium as defined in claim 4, wherein a reflection layer is placed between the first shielding layer and the second shielding layer so as to prevent a light beam from reaching the recording layer.

30. The magneto-optical recording medium as defined in claim 29, wherein the reflection layer is made of any one material selected from the group consisting of Al, AlTi, AlTa, AlPt, AlAu, AlCu, AlSi, AlFe, AlNi, AlCo, AlGd, AlTb, AlDy and AlNd.

31. The magneto-optical recording medium as defined in claim 30, wherein the reflection layer is made of an alloy represented by $Al_{1-X3}Fe_{X3}$, where X3 is in the range of $0.02 \leq X3 \leq 0.50$.

32. The magneto-optical recording medium as defined in claim 30, wherein the reflection layer is made of an alloy represented by $Al_{1-X4}Ni_{X4}$, where X4 is in the range of $0.02 \leq X4 \leq 0.50$.

33. The magneto-optical recording medium as defined in claim 30, wherein the reflection layer is made of an alloy represented by $Al_{1-X5}Ti_{X5}$, where X5 is in the range of $0.02 \leq X5 \leq 0.98$.

34. The magneto-optical recording medium as defined in claim 29, wherein a transparent dielectric layer, the reproducing layer, the first shielding layer, a non-magnetic intermediate layer, the reflection layer, the second shielding layer, the recording layer and a protective layer are successively formed on a substrate in this order.

35. The magneto-optical recording medium as defined in claim 34, wherein the reflection layer has a film thickness of not more than 40 nm.

36. A method for reproducing information on a magneto-optical recording medium including a recording layer that is made of a perpendicular magnetization film and has record bits for recording information; a reproducing layer that is maintained in a perpendicular magnetization state in a signal-reproducing region in which the magnetization of each record bit on the recording layer is copied onto said region; and a first shielding layer that is made of a magnetic film exhibiting in-plane magnetization from room temperature to its Curie temperature and formed between the recording layer and the reproducing layer, by reading a magnetization in the signal-reproducing region of the reproducing layer, the method comprising:

a first step of forming the signal-reproducing region larger than the record bit in the reproducing layer and causing the magnetization in a first portion of the first shielding layer, which corresponds to the signal-reproducing region of the reproducing layer, to disappear; and the first step of causing a region of the reproducing layer, other than the signal-reproducing region, to exhibit in-plane magnetization by magnetically coupling said region with a first portion of the first shielding layer, which is a portion other than the first portion.

37. The method as set forth in claim 36, wherein the first step further includes heating the first portion of the first shielding layer to a temperature not lower than its Curie temperature by applying a light beam.

38. The method as set forth in claim 36, further comprising providing a first shielding layer between the recording layer and the reproducing layer for preventing magnetizations of record bits other than a selected record bit to be reproduced from being copied to the reproducing layer.

39. The method as set forth in claim 38, wherein a magnetic film that is in an in-plane magnetization state from room temperature to its Curie temperature is used as the first shielding layer, and the first step further includes heating a third portion of the first shielding layer, which corresponds to the record bit to be reproduced, to a temperature not lower than its Curie temperature by applying a light beam.

40. The method as set forth in claim 38, wherein a magnetic film which is in an in-plane magnetization state from room temperature to a predetermined critical temperature and in a perpendicular magnetization state from the critical temperature to its Curie temperature is used as the first shielding layer, and the first step further includes heating the third portion of the first shielding layer, which corresponds to the record bit to be reproduced, to a temperature not lower than the critical temperature by applying a light beam.

41. The method as set forth in claim 36, wherein the first step further includes forming the signal-reproducing region of a size substantially equal to a diameter of a light beam spot in the reproducing layer by applying a light beam.

42. The method as set forth in claim 36, further comprising erasing the signal-reproducing region in the reproducing layer after reproduction.

* * * * *